United States Patent [19]
Lippert et al.

[11] Patent Number: 5,365,558
[45] Date of Patent: Nov. 15, 1994

[54] FUEL ASSEMBLY FOR A BOILING WATER REACTOR, WITH A FOOT ASSEMBLED FROM STANDARDIZED PARTS

[75] Inventors: Hans-Joachim Lippert, Höchstadt; Werner Meier, Kunreuth, both of Germany

[73] Assignee: Siemens Aktiengesellschaft, Munich, Germany

[21] Appl. No.: 33,507

[22] Filed: Mar. 18, 1993

[30] Foreign Application Priority Data

Sep. 18, 1990 [DE] Germany ............... 4029539

[51] Int. Cl.$^5$ ............................................. G21C 1/04
[52] U.S. Cl. ................................. 376/445; 376/352
[58] Field of Search .............. 376/434, 352, 313, 443, 376/442, 451, 445; 926/DIG. 60

[56] References Cited

U.S. PATENT DOCUMENTS

| | | | |
|---|---|---|---|
| 4,035,233 | 7/1977 | Williamson et al. | 376/440 |
| 4,655,995 | 4/1987 | Freeman | 376/267 |
| 4,663,118 | 5/1987 | Nelson | 376/445 |
| 4,997,621 | 5/1991 | Johansson et al. | 376/444 |
| 5,002,725 | 5/1991 | Lettav et al. | 376/444 |
| 5,009,839 | 4/1991 | King | 376/352 |
| 5,132,077 | 7/1992 | Bryan | 376/352 |

FOREIGN PATENT DOCUMENTS

| | | |
|---|---|---|
| 0122191 | 10/1984 | European Pat. Off. . |
| 0311037 | 4/1989 | European Pat. Off. . |
| 2046272 | 3/1971 | Germany . |
| 3619930 | 2/1987 | Germany . |

Primary Examiner—Donald P. Walsh
Assistant Examiner—Meena Chelliah
Attorney, Agent, or Firm—Herbert L. Lerner; Laurence A. Greenberg

[57] ABSTRACT

A fuel assembly for a boiling water reactor includes a cluster of mutually parallel fuel rods. A fuel assembly channel laterally surrounds the cluster of fuel rods and has open upper and lower ends. A top plate covers the upper open end of the fuel assembly channel and has coolant outlets formed therein. A foot part is assembled from a plurality of individual parts and includes a cast transitional piece having a lower end with an inlet opening formed therein and an upper edge inserted into the open lower end of the fuel assembly channel. The transitional piece defines and surrounds a flow channel widening upward in funnel-like fashion from the inlet opening. The foot part also includes a base plate being disposed at and welded to the upper edge of the transitional piece. The base plate covers the open lower end of the fuel assembly channel and has coolant inlets formed therein. A foot part for a fuel assembly of a boiling water reactor includes a transitional piece defining and surrounding a flow channel widening in funnel-like fashion upward along a center axis. The transitional piece has a lower end with at least one inlet opening formed therein and an upper end with an edge. A one-piece base plate is welded to the edge, covers the flow channel at the top and has coolant inlets formed therein for a flow of coolant through the fuel assembly.

20 Claims, 22 Drawing Sheets

FUEL ASSEMBLY FOR A BOILING WATER REACTOR, WITH A FOOT ASSEMBLED FROM STANDARDIZED PARTS

CROSS-REFERENCE TO RELATED APPLICATION

This application is a Continuation of International Application Serial No. PCT/DE91/00735, filed Sep. 17, 1991.

SPECIFICATION

The invention relates to a fuel assembly for a boiling water reactor, and in particular to the foot part of such a fuel assembly.

It is known that a fuel assembly for a boiling water reactor contains a bundle or cluster of mutually parallel fuel rods that is laterally surrounded by a fuel assembly channel which is open at the top and bottom. The open lower end of the fuel assembly channel is covered by a foot part, and the upper end is covered by a top plate provided with coolant outlets.

The foot part is usually formed of a transitional piece and a base plate, which are manufactured together from a single cast part. The transitional piece surrounds a flow channel that widens toward the top in funnel-like fashion along a center axis and has a lower end with at least one inlet opening and an upper end with an edge which is adjoined by the base plate and is inserted into the open lower end of the fuel assembly channel.

In the prior art, the fuel rods have lower end caps which are guided in bores of the base plate. Some of the fuel rods are then screwed to the base plate and are also joined at upper end pieces thereof to the top plate, so that they form a rigid skeleton. If access to the interior of the fuel assembly is necessary, in order to replace individual fuel rods or for other servicing work, then the skeleton must be dismantled after the fuel assembly channel is removed.

Due to the screw connection and bores for inserting the fuel rods, there is only a limited space for through openings, through which the coolant (water) of the reactor is introduced into the fuel assemblies. Since on the other hand the coolant should only undergo the slightest possible pressure loss as it passes through the flow openings, the space must be adapted to the entire configuration of the fuel assembly in a manner that is appropriate for thermohydraulic conditions.

Therefore, each time that the fuel assembly configuration is changed, the geometry of the base plate, with its bores and openings, must be adapted as well, so that new cast forms are repeatedly needed.

The foot part is also a relatively complicated three-dimensional object, the production of which requires an expensive casting process and involves a high rejection rate. Especially at the base plate, with its complicated system of openings and webs, irregularities virtually always occur and must be remachined afterward.

It is accordingly an object of the invention to provide a fuel assembly for a boiling water reactor with a foot assembled from standardized parts, which overcomes the hereinafore-mentioned disadvantages of the heretofore-known devices of this general type, which lessens the expense for production by improving the configuration of the foot part and which eases adaptation to the configuration of the particular fuel assembly.

With the foregoing and other objects in view there is provided, in accordance with the invention, a foot part for a fuel assembly of a boiling water reactor, comprising a transitional piece defining and surrounding a flow channel widening in funnel-like fashion upward along a center axis, the transitional piece having a lower end with at least one inlet opening formed therein and an upper end with an edge; and a one-piece base plate being welded to the edge, covering the flow channel at the top and having coolant inlets formed therein for a flow of coolant through the fuel assembly.

In accordance with another feature of the invention, the base plate and/or the upper edge of the transitional piece have a profile with which the base plate engages the upper edge of the transitional piece.

In accordance with a further feature of the invention, the base plate is mounted on the upper edge of the transitional piece with a play at right angles to fuel rods in the fuel assembly, and the base plate is fixed in a dimensionally accurate position by a weld.

German Published, Non-Prosecuted Application DE 36 19 930 A1, corresponding to U.S. Pat. No. 4,663,118, discloses a different configuration of a boiling water fuel assembly, in which the fuel rods are screwed to a top plate and a base plate and form an insert that can be thrust into the fuel assembly channel and inserted at the upper edge of the funnel-like transitional piece. The fuel assembly channel and the transitional piece, which are made from different materials, are joined together in a load-bearing manner, which requires special provisions.

The foot part accordingly substantially includes two prefabricated parts: the transitional piece and a one-piece base plate (rod holder plate). The transitional piece can easily be manufactured as a cast part that is not covered at the top, while the base plate can be manufactured as a flat sheet-metal part. The production costs for these two parts are approximately half the cost for casting a one-piece foot part. Even if the transitional piece and the base plate, before or after being welded, are also remachined for the sake of particular dimensional accuracy, the requisite labor to accomplish this is less than for remachining foot parts cast in one piece. Moreover, the rejection rate is also reduced.

Even though fuel assemblies of substantially the same size are still needed for different reactor types and for the different generations of fuel assemblies in a reactor, only slight changes in the cross sections are usually needed for different fuel assembly types, even if the foot parts are of different heights under some circumstances. It is therefore possible to make do with standardized casting tools, and in particular these casting tools may be constructed adaptably with respect to only a few parameters (such as the height of the foot part). In many cases, it is sometimes completely unnecessary to do any remachining of the finished foot part after welding.

With the objects of the invention in view, there is also provided a fuel assembly for a boiling water reactor, comprising a cluster or bundle of mutually parallel fuel rods; a fuel assembly channel laterally surrounding the cluster of fuel rods and having open upper and lower ends; a top plate covering the upper open end of the fuel assembly channel and having coolant outlets formed therein; and a foot part being assembled from a plurality of individual parts and including a cast transitional piece having a lower end with an inlet opening formed therein and an upper edge inserted into the open lower end of the fuel assembly channel, the transitional piece defining and surrounding a flow channel widening upward in funnel-like fashion from the inlet opening; and a base plate being disposed at and welded to the upper edge of the transitional piece, the base plate covering the open lower end of the fuel assembly channel and having coolant inlets formed therein.

Even more individual parts may also be mounted on the base part.

In accordance with another feature of the invention, there is provided a plurality of springs being supported against the fuel assembly channel and, for instance, resting on the base plate and on the upper edge of the transitional piece.

In accordance with a further feature of the invention, the springs have an edge that engages a lateral profile on the upper edge of the foot part.

In accordance with an added feature of the invention, the base plate has bores formed therein being engaged by means for fastening at least some of the fuel rods.

In accordance with an additional feature of the invention, the fastening means are plug-type connections.

In accordance with yet another feature of the invention, one group of the fuel rods is shorter than another group of the fuel rods, and the fastening means are provided only for the shorter fuel rods. The plug-type connections are especially advantageous in this case.

This is intended above all for cases in which, in accordance with yet a further feature of the invention, the base plate has an opening in the middle that is engaged by the lower end piece of a water pipe parallel to the fuel rods which connects the base plate to the top plate in a force-locking manner. Water pipes of this kind that are open at the bottom and top are often provided so as to deliver an adequate quantity of liquid moderator to the upper part of the fuel assembly as well, where a large portion of the water is in the form of steam.

In this construction, the base plate, water pipe and top plate accordingly form the skeleton of the fuel assembly. In accordance with yet an added feature of the invention, the lower end piece of the water pipe is held in the opening of the base plate in such a manner as to be protected against torsion.

In accordance with yet an additional feature of the invention, the base plate is mounted on the upper edge.

In accordance with again another feature of the invention, the base plate has a lower surface with an encompassing groove formed therein facing toward the flow channel, the upper edge of the transitional piece being engaged in the groove.

In accordance with again a further feature of the invention, the groove forms a gap being open toward the flow channel.

In accordance with again an added feature of the invention, the upper edge of the transitional piece has lugs protruding into the gap with fitting surfaces resting on the base plate.

In accordance with again an additional feature of the invention, the fuel assembly channel has a square inside cross section, the transitional piece and the base plate each have a square outside cross section with four lateral surfaces oriented toward the fuel assembly channel, and each of the lateral surfaces has a middle part with a weld applied from the side toward the fuel assembly channel.

In accordance with still another feature of the invention, the base plate is penetrated in sieve-like fashion by the coolant inlets, and the coolant inlets have a shape trapping foreign bodies exceeding predetermined dimensions being entrained in the coolant.

In accordance with a concomitant feature of the invention, the transitional piece has at least two openings formed therein extending laterally out of the flow channel.

Other features which are considered as characteristic for the invention are set forth in the appended claims.

Although the invention is illustrated and described herein as embodied in a fuel assembly for a boiling water reactor with a foot assembled from standardized parts, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
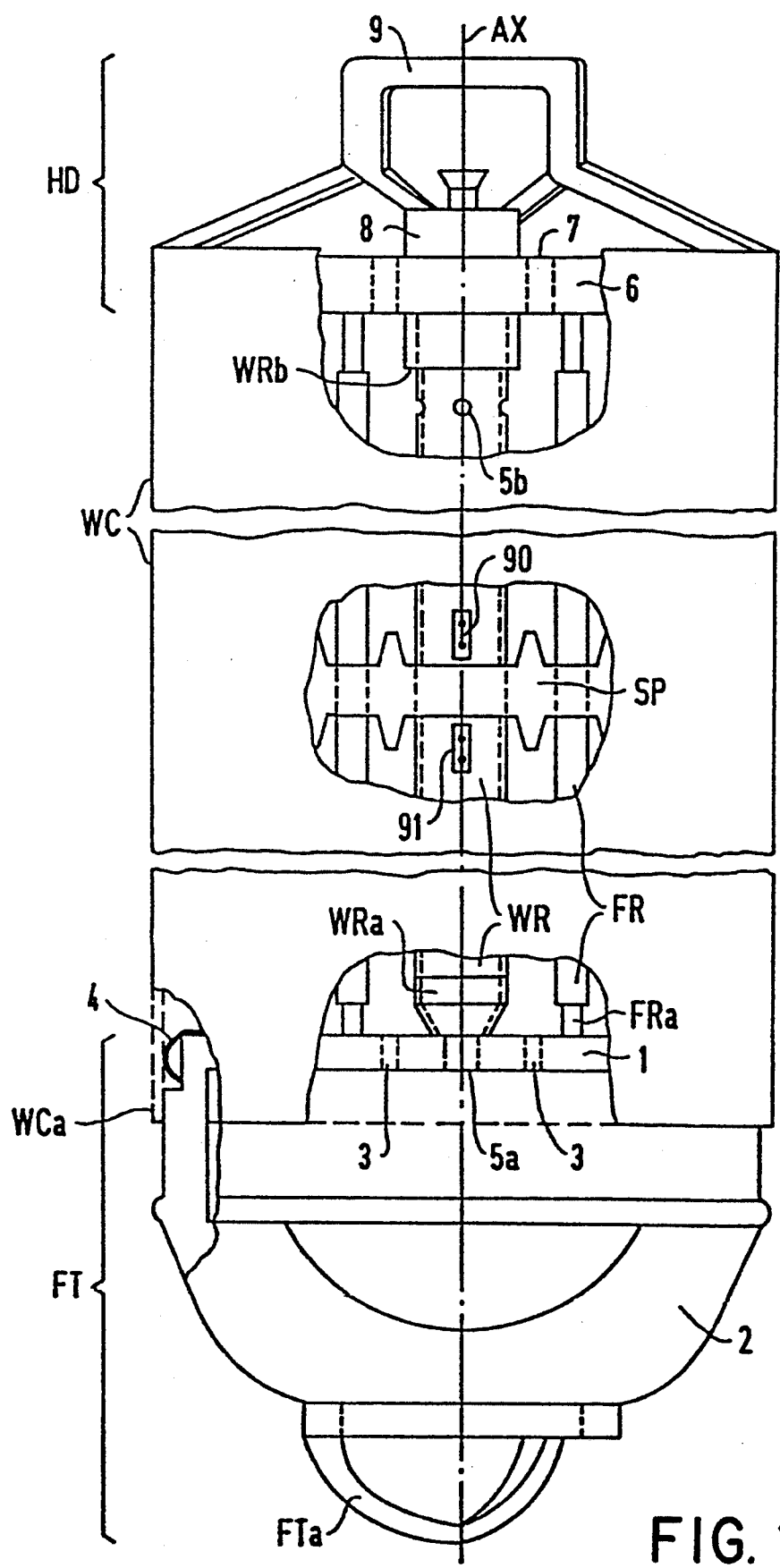
FIG. 1 is a fragmentary, diagrammatic, partly broken-away, side-elevational view of a basic representation of the most important parts of a fuel assembly for boiling water reactors.

Referring now to the figures of the drawing in detail and first, particularly, to FIG. 1 thereof, there is first of all seen a diagram, which is not true to scale, of a ready-assembled fuel assembly, having a longitudinal axis which is denoted by reference symbol AX.

The fuel assembly is laterally surrounded by a fuel assembly channel WC, which is open at top and bottom. Located there are a fuel assembly head HD and a fuel assembly foot part FT.

The foot part FT is positioned by means of a clip FTa on a base grid in the core of a reactor. A transitional piece 2 forms a flow duct, which leads from an inlet opening 3a seen in FIG. 2 to coolant inlets 3 in a base plate 1, which covers the foot part or the lower end of the fuel assembly. The transitional piece 2 defines and surrounds a flow channel widening upward in funnel-like fashion from the inlet opening 3a. A lower edge WCa of the fuel assembly channel WC is supported and to a great extent sealed against the foot part FT and its base plate 1 by means of a sealing spring 4.

In the axial direction, a coolant pipe ("water pipe") WR extends through the interior, and preferably through the center, of the channel WC. Lower and upper ends of the coolant pipe WR bear respective end pieces WRa and WRb as well as openings 5a, 5b for the passage of coolant (water).

Figure 34:
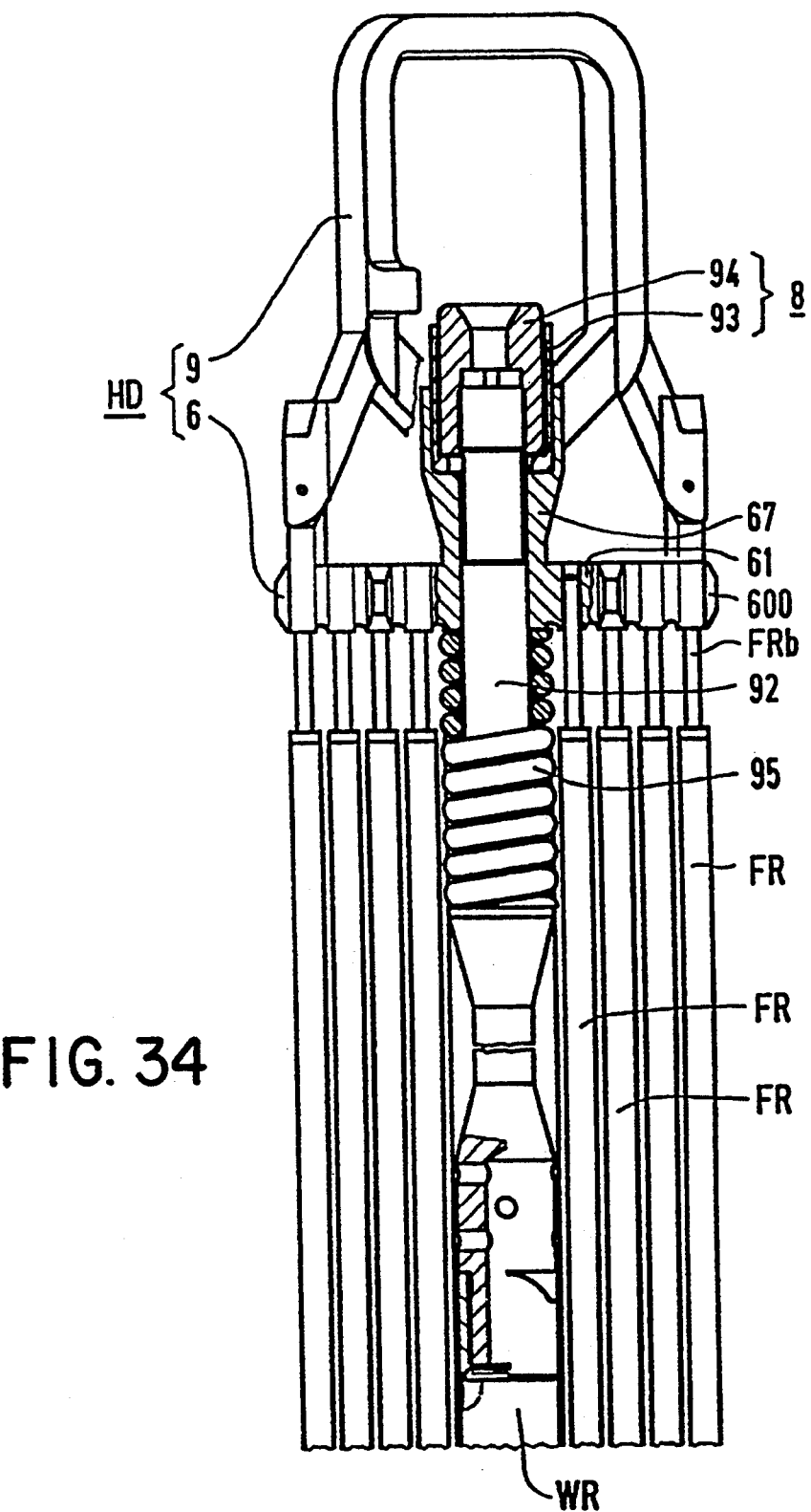
FIGS. 34 and 35 are longitudinal-sectional and plan views of a fuel assembly.

Disposed between stop elements 90, 91 that are fitted at predetermined axial positions on the coolant pipe, are spacers SP which are perpendicular to the pipe WR and contain supporting webs. These supporting webs form a grid with meshes or mesh openings, which may be formed, for example, by welded-together sleeves or by longitudinal webs and transverse webs passing perpendicularly through one another. Supported on these webs are a multiplicity of fuel rods FR, which in each case are parallel to the channel, pass through the meshes of a plurality of spacers and bear closure caps FRa at the bottom and closure caps FRb at the top as seen in FIG. 34.

The fuel assembly head HD has a top plate 6, which covers the fuel assembly channel WC at the top and has coolant outlets 7. Disposed on the upper surface of the top plate is a grip 9. The top plate 6, the grip 9 and the upper end piece WRb of the coolant pipe are held against one another by means of a connecting part 8 that is constructed as a stop element.

In this configuration, the fuel rods FR are essentially clamped firmly in the meshes of the spacers, and the base plate 1 and the top plate 6 serve only as stops which prevent major axial movement of the rods.

Therefore, the closure caps of the fuel rods do not have any threads with which they are screwed to the plates.

Rather, the fuel rods stand with their lower closure caps on the base plate and are also only loosely guided with the upper closure caps in corresponding receiving positions on the top plate.

Thus, the fuel assembly essentially contains a fuel assembly channel laterally surrounding a bundle or cluster of mutually parallel fuel rods and being open at the top and bottom, a top plate being provided with coolant outlets and covering the upper edge of the fuel assembly channel, and a foot part, which is first of all considered further below. This foot part FT contains the transitional piece 2, which is inserted with its upper edge into the open lower end of the fuel assembly channel WC. Attached to this upper edge of the transitional piece 2 is the base plate 1, which covers the cross section of the open lower end of the fuel assembly channel (and consequently the upper end of the transitional piece) and contains the coolant inlets 3.

Figure 2:
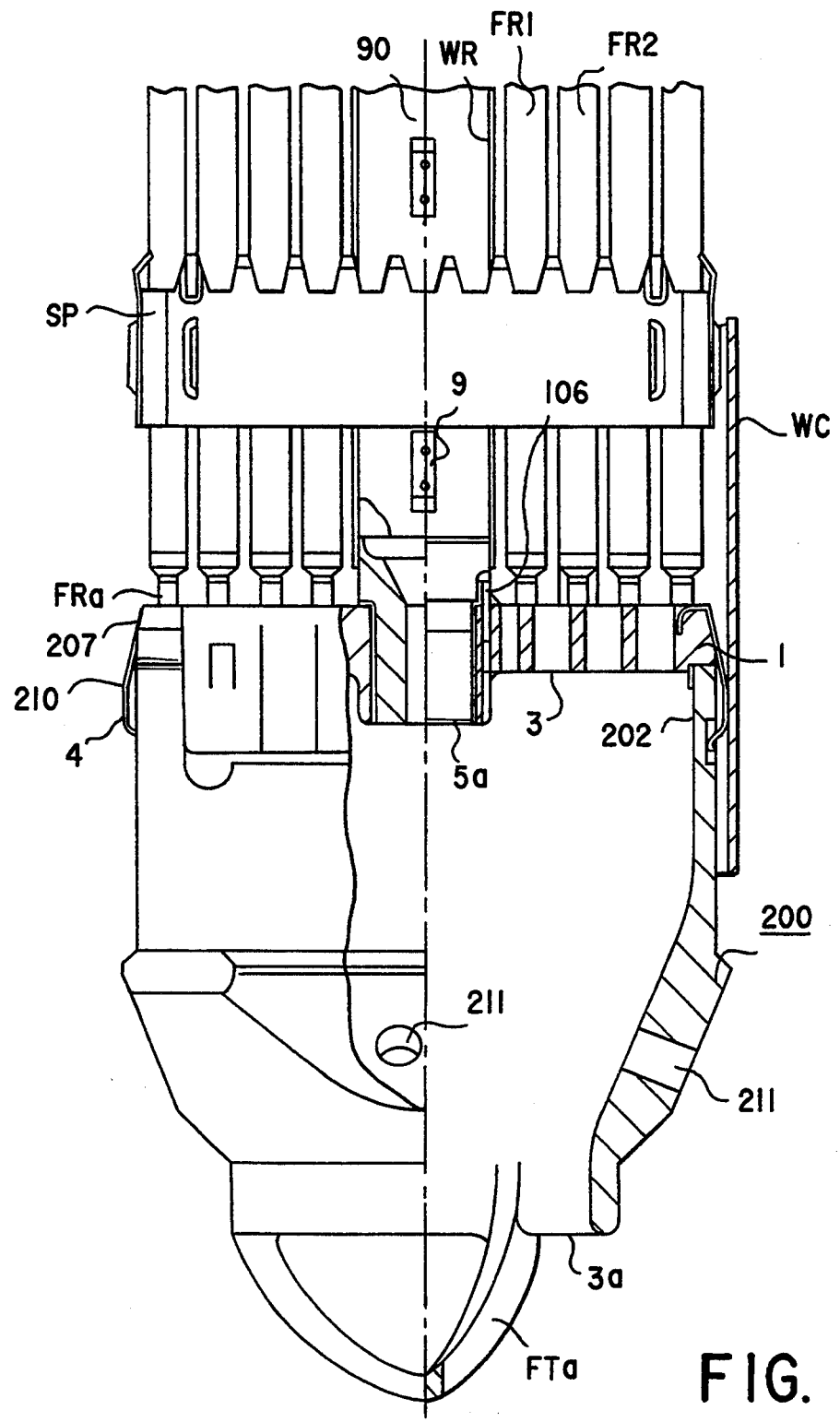
FIG. 2 is a fragmentary, partly sectional and partly side-elevational view of the lower end of the fuel assembly, with a broken-away wall of the foot part.

FIG. 2 shows a flow duct which leads from the inlet opening 3a at the clips FTa to the coolant inlets 3 in the base plate 1 and to the lower opening 5a of the water pipe WR. The flow duct is laterally surrounded by a transitional piece 200 having an upper edge 202 which is inserted from below into the open lower end of the fuel assembly channel WC. The base plate 1, which has the coolant inlets 3, is attached to the upper edge 202 of the transitional piece and covers the lower opening of the fuel assembly channel. This produces an edge 207, which runs along the inner surface of the lower open end of the fuel assembly channel.

An elongate sealing spring 4 extends approximately parallel to the edge and has an arch, which is bent around the edge 207, is directed toward the fuel assembly channel and is supported there. Such sealing springs serve for stabilizing the flow through the fuel assembly and to a great extent prevent the overpressure building up in the fuel assembly from being able to find compensation through a bypass between the foot part and the channel. A plurality of openings 211 leading laterally through the transitional piece out of the flow channel also serve for flow stabilization.

Instead of a one-part casting according to the prior art, in this case two individual parts are provided: the cast transitional piece and the base plate which, for example, may also be cast or punched out from a metal sheet, and is attached to the upper edge 202 of the transitional piece and welded on there by means of a weld 210.

The base plate and/or the upper edge of the transitional piece advantageously has a profile, so that the base plate engages in the upper edge of the transitional piece by means of this profile. This is shown in FIG. 3, where the lower surface of the base plate has a peripheral fitting groove 206 facing the transitional piece, in which the upper edge 202 of the transitional piece engages.

Figure 3:
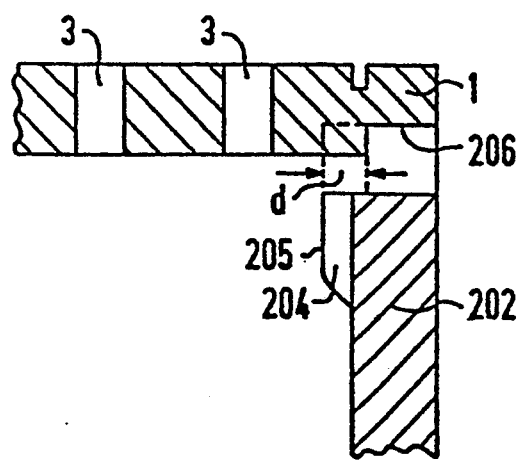
FIG. 3 is a fragmentary, sectional view of a joint between a transitional piece and a base plate in the foot part.

FIG. 3 reveals that this groove 206 forms a gap d along with the engaging edge 202 which is open toward the flow duct. In this configuration, the upper edge of the transitional piece has a plurality of lugs 204 which project into the gap and bear against the base plate with a fitting surface 205. In this configuration, the fitting surface 205 and the fitting groove 206 may be produced by subsequent machining of the prefabricated parts 1 and 200. It is therefore possible in the event of a change in construction of the fuel assembly to retain the cast form for the transitional piece and exchange only the base plates, with it being possible to achieve dimensional accuracy by subsequent remachining.

Figure 4:
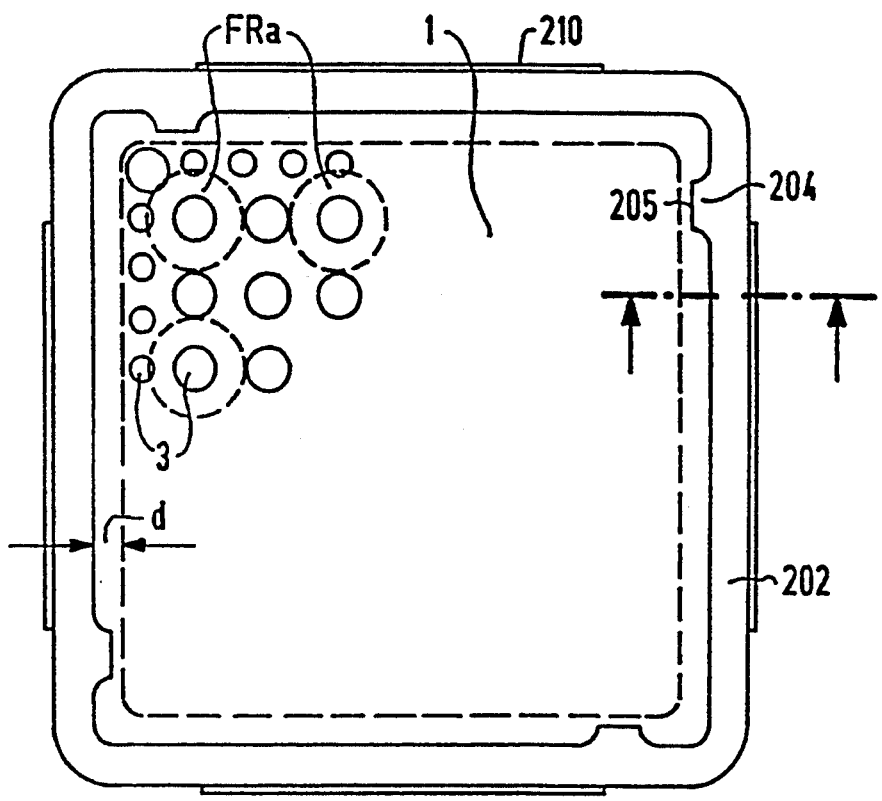
FIG. 4 is a plan view of the foot part.

As FIG. 4 shows, in particular in the case of a fuel assembly with a square channel, a square base plate and a transitional piece merging into a square outer cross section, it is advantageously envisaged to provide only one lug which projects into the gap d on each of the four lateral surfaces of the transitional piece.

However, these lugs may also be omitted entirely. The base plate is then seated initially just with a considerable lateral clearance, provided by the width of the gap d, at the upper edge of the transitional piece. Nevertheless, a dimensionally accurate seating can be achieved if the two parts are fixed in the desired relative position with respect to each other during welding by means of an appropriate holding tool.

FIG. 4 shows the upper edge 202 with the lugs 204 as well as the base plate 1 and the weld 210 connecting the two parts to each other. In this configuration, the lateral surfaces of the rectangular base plate and of the rectangular transitional piece in each case have the weld 210 only on their central parts, and the weld is applied on the outside of the foot part, facing the fuel assembly channel. Thus, no weld needs to run around the rounded-off corners.

FIG. 4 furthermore shows that the base plate 1 is perforated by coolant inlets in a sieve-like manner. These inlets are shaped in such a way that foreign bodies entrained in the coolant (for example broken-off spring parts, screws, metal chips) are held back at the inlets if they exceed predetermined dimensions. These predetermined dimensions are governed by the geometry of the spacers SP and are chosen in such a way that foreign bodies which can become caught between the fuel rods and the webs of the spacers in the spacer meshes are already held back at the base plate.

The contours of the fuel rods FR of the fuel assembly are indicated in FIG. 4 by dashed lines. The coolant inlets in the base plate 1 are advantageously chosen in such a way that as many of these inlets as possible open out into the intermediate spaces between the fuel rods. In that case, the inlet openings 3 can be configured as bores of equal sizes which are distributed virtually uniformly over the base plate, although it may be advantageous to provide a greater number of smaller, additional bores at particular points, for example at the edge of the base plate and/or in the vicinity of the coolant pipe WR.

In the prior art, the fuel rods FR have lower end caps FRa, which engage in corresponding bores of the base plate and are partially screwed there. In that configuration, the sealing springs 4 have corresponding openings in a side part bent around the edge 207, through which these lower end caps of the fuel rods extend in order to hold this spring firmly on the base plate. After removal of the fuel rods, the springs lose their hold and may drop off. If the end caps FRa of the fuel rods are not held in corresponding openings of the base plate (for example because they already end above the base plate, even in the ready-assembled state), such spring structures cannot be used.

Figure 5:
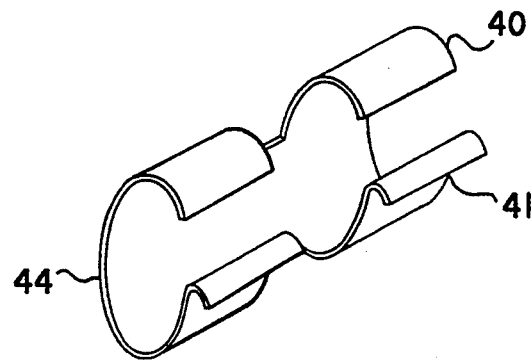
FIG. 5 is a perspective view showing the principle of a clipped-on sealing spring.

Therefore, a sealing spring is envisaged having a principle which is represented in FIG. 5 and which is clipped onto the foot part.

This sealing spring has a central part 44, which extends between the upper edge of the transitional piece and the fuel assembly channel and is arched around a line of curvature parallel to the edge 207. This central part 44 is supported against the inner surface of the fuel assembly channel WC. In order to clip this sealing spring onto the foot part, according to FIGS. 5 to 9 there is provided a first side strip 41 underneath the central part, which is engaged in a profiled groove 409 in FIG. 9 or 43 in FIG. 6. According to FIGS. 10 to 14, this first side strip, engaging in the profiled edge, may have the form of butt straps projecting laterally from the central part. Provided above the central part is a second side strip 40, which extends around the edge 207 and bears against the outer surface of the base plate 1, facing the fuel rod bundle or cluster. This second side strip 40 may in particular have a claw-shaped bent edge, which engages in a retaining profile or profiled edge 42 seen in FIG. 6, on the outer surface of the base plate.

Figure 6:
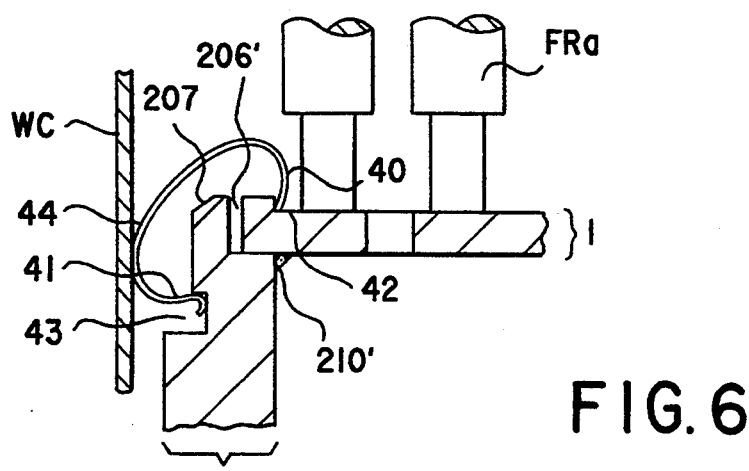
FIG. 6 is a fragmentary, sectional view showing a fastening of the sealing spring between the channel and foot part.

As a departure from FIGS. 2 and 3, in this case FIG. 6 additionally shows that a fitting groove 206' may also be machined-in, for inserting the base plate on the upper edge of the transitional piece. In this case too, the base plate need not be machined accurately to size, but rather it is sufficient if it is attached with a lateral clearance (i.e. it is movable approximately perpendicularly to the fuel rods) relative to the upper edge of the transitional piece. Its dimensionally accurate position is then not fixed until during welding, by a weld 210'.

Figure 7:
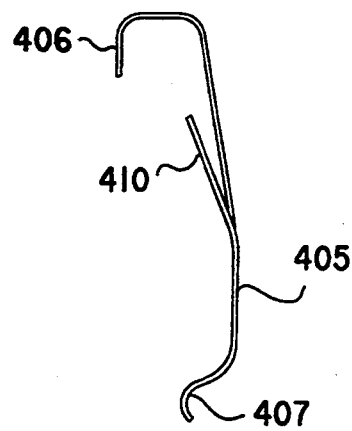
FIGS. 7 and 8 are respective cross-sectional and side-elevational views of the sealing spring.

FIG. 7 shows a preferred embodiment of the clipped-on sealing spring 4 with an arched central part 405, an S-shaped first side strip 407 and a horseshoe-shaped bent second side strip 406.

Figure 8:
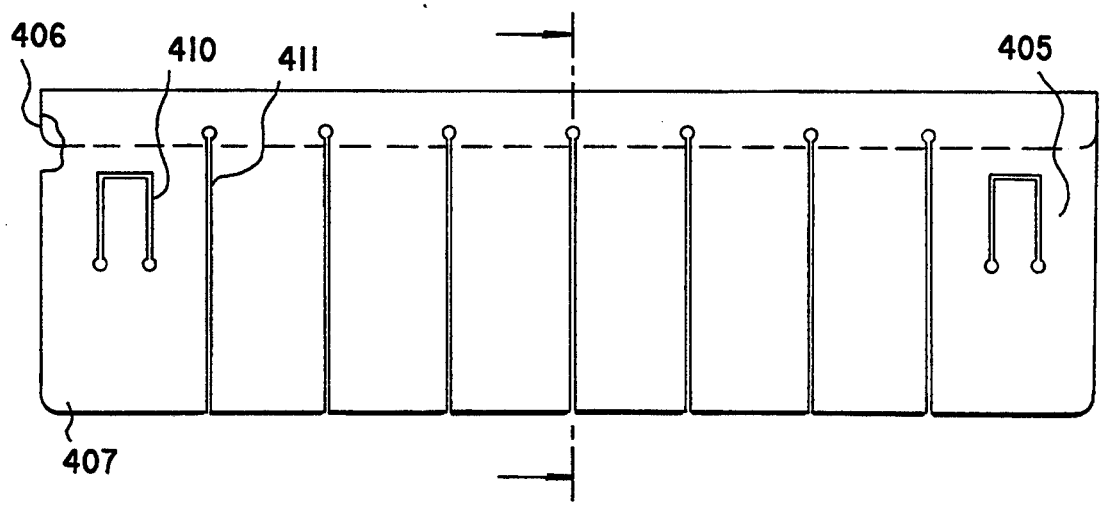

FIG. 8 shows a plan view of the elongate spring, wherein the central part 405 and the first side strip 407 thereof have transverse slits 411, which are thus aligned parallel to the fuel rods. This produces resilient fingers, which are attached to the second side strip 406.

Figure 9:
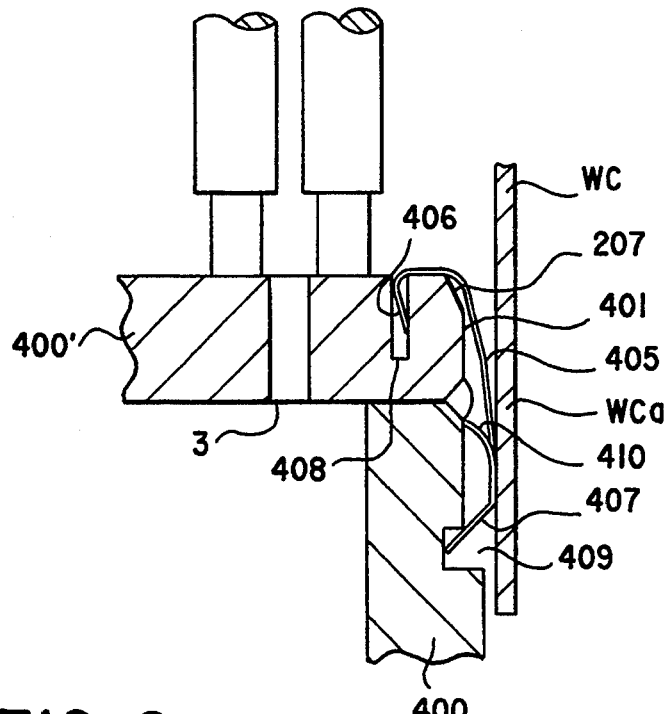
FIG. 9 is an enlarged, fragmentary, cross-sectional view of the lower end of the fuel assembly in the region of the side edge of the foot part.

The fastening of such a spring on the foot part is represented in FIG. 9. While the second side strip 406 engages in a slit 408 which is approximately parallel to the edge and serves as a retaining profile, the transitional piece has the profiled groove 409, which runs underneath the edge externally around the foot part and into which the first side strip 407 engages.

Furthermore, the central part has catches 410, which are bent in the direction of the base plate and the second side strip and are supported on a side profile of the foot part. In FIG. 9, this side profile is formed by the weld between the base plate and the transitional piece, with a base plate 400' in this case having an edge 401 being fitted flush on the upper edge of a transitional piece 400, that likewise has a lateral clearance and is only positioned dimensionally accurately by the weld.

Figure 10:
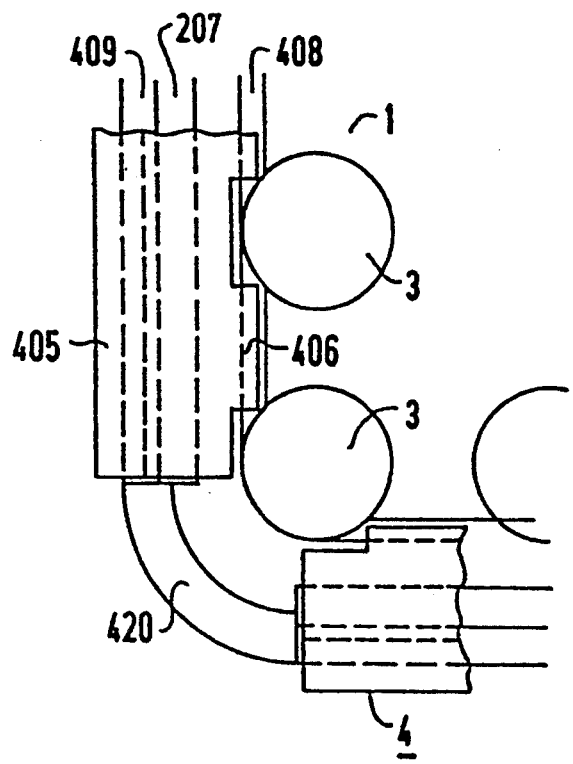
FIGS. 10 and 11 are fragmentary plan and cross-sectional views of a corner of the foot part with part-springs clipped thereon.
Figure 11:
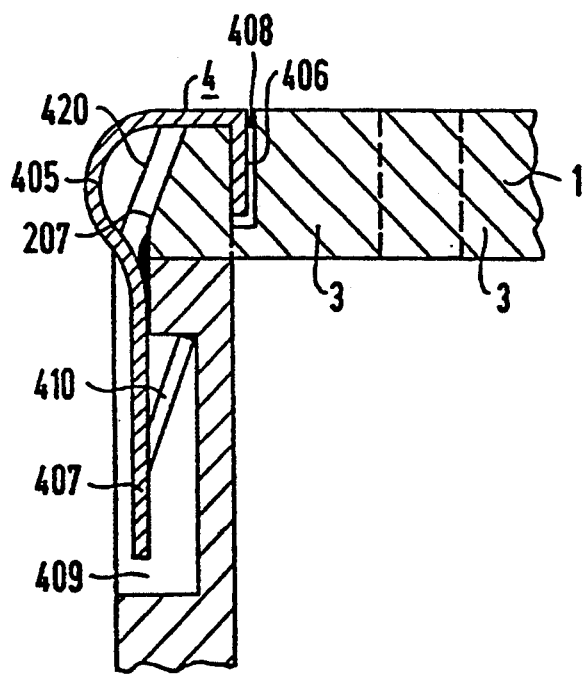
Figure 12:
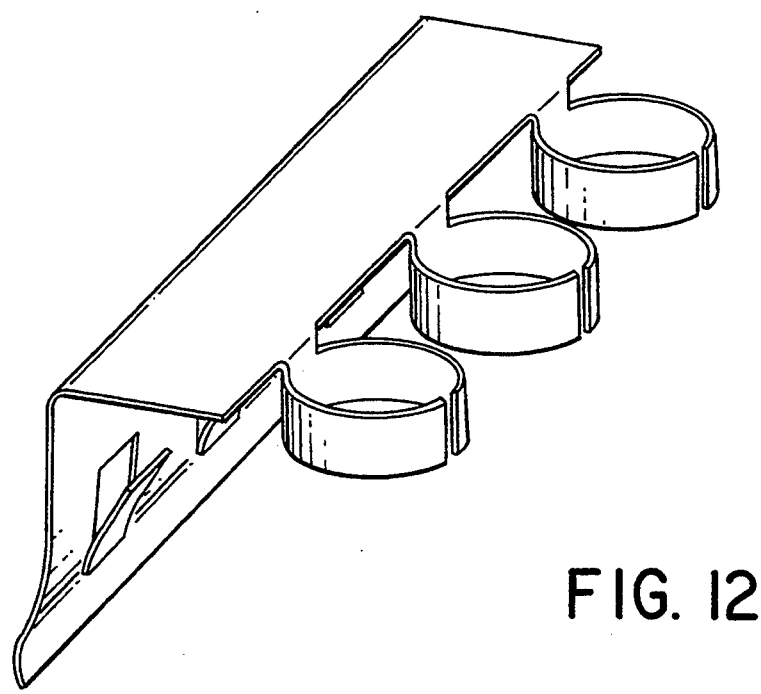
FIGS. 12 to 14 are fragmentary perspective, plan and cross-sectional views of a clamped-on sealing spring.

As a rule, the fuel assembly channel has a virtually square or at least polygonal cross section, to which the foot part is adapted. The foot part thus has planar lateral surfaces and rounded-off corners. FIGS. 10 and 11 show that then the sealing spring also respectively includes a part-spring for each lateral surface respectively having an arched central part and side strips adjoining the latter.

In FIG. 10, the part-springs are partly broken away, in order to reveal the slit 408, which serves as a retaining profile in the base plate for the claw-shaped second side strip 406. This slit 408 runs parallel to the edge 207 of the foot part, but need not extend around the rounded-off corners 420. For reasons of space, it may be relocated so close to the coolant inlets 3 that it connects them, and in particular opens out tangentially into such passages.

FIG. 11 shows a cross section through the foot part with the rounded-off corners 420, the edge 207, and the profiled groove 409, which runs externally virtually around the foot part, underneath the edge, i.e. it extends over the lateral surfaces of the foot part, at least outside the rounded-off corners 420, and engages the catches 410 of the first side strip 407. According to FIGS. 12 to 14, the arched central part has the catches 410, which are likewise bent in the direction of the base plate 1 and the second side strip 406 and are supported on a side profile of the foot part.

Figure 13:
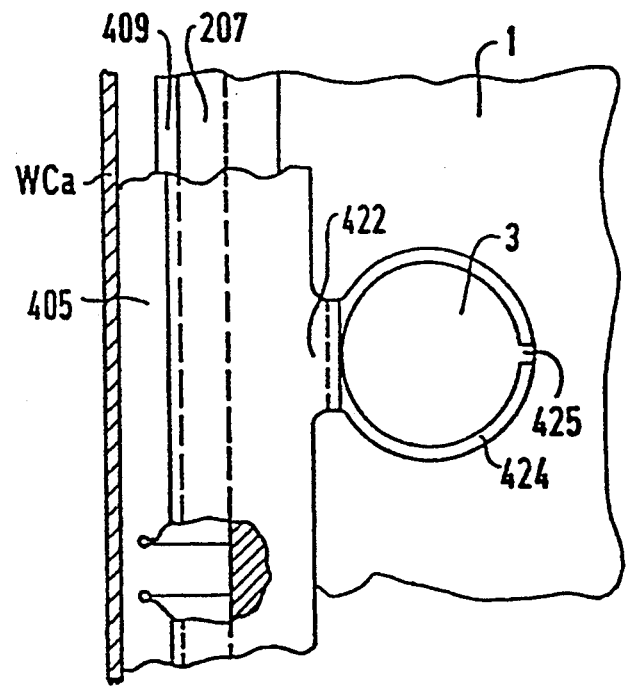
Figure 14:
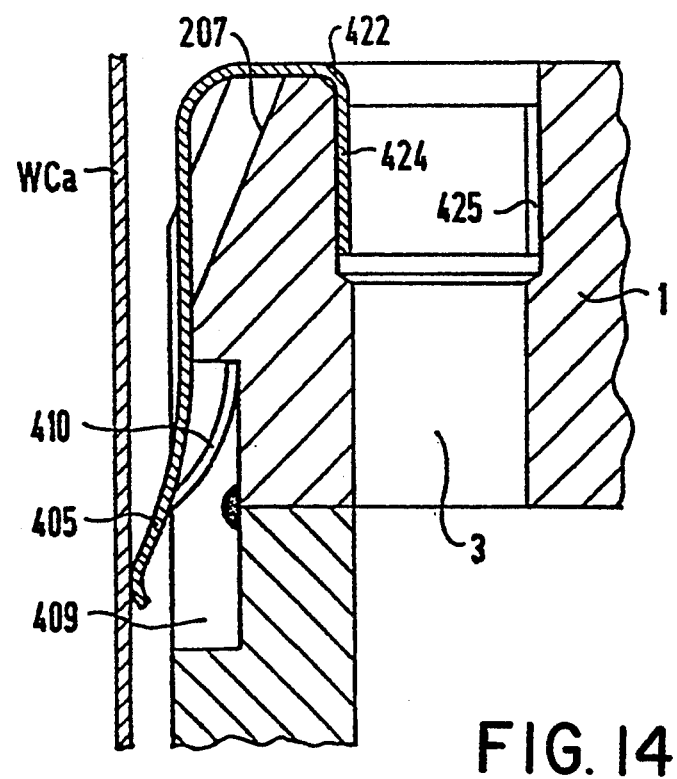

The sealing spring according to FIG. 13 also has a central part 405 and first and second side strips 421 and 422 adjoining it, with the second side strip, which is disposed above the central part, extending around the edge 207. However, this second side strip also embraces at least one of the coolant passages 3 and is firmly clamped there by means of a sleeve inserted in the coolant passage. In FIGS. 13 and 14, a sleeve 424 encloses the coolant inlet entirely, apart from a longitudinal slit 425, with the sleeve 424 being flexible and being able to be inserted into the coolant inlet 3 by pressing it together. This flexible sleeve 224 is formed onto the second side strip.

Figure 15:
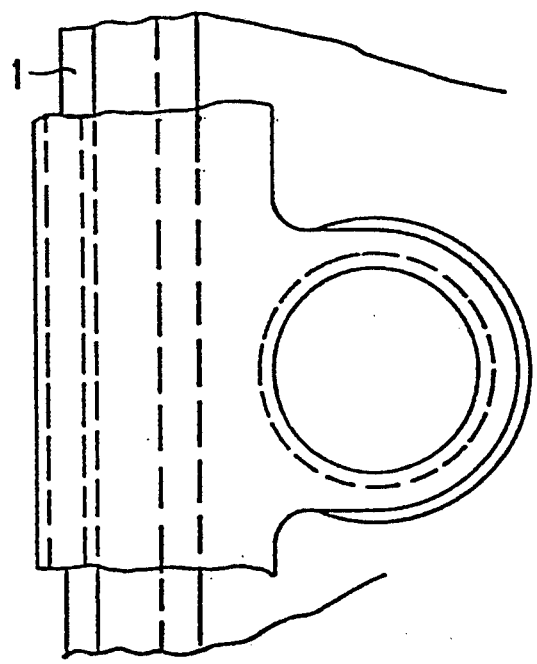
FIGS. 15 and 16 are plan and cross-sectional views of a sealing spring with a formed-on insert sleeve.
Figure 16:
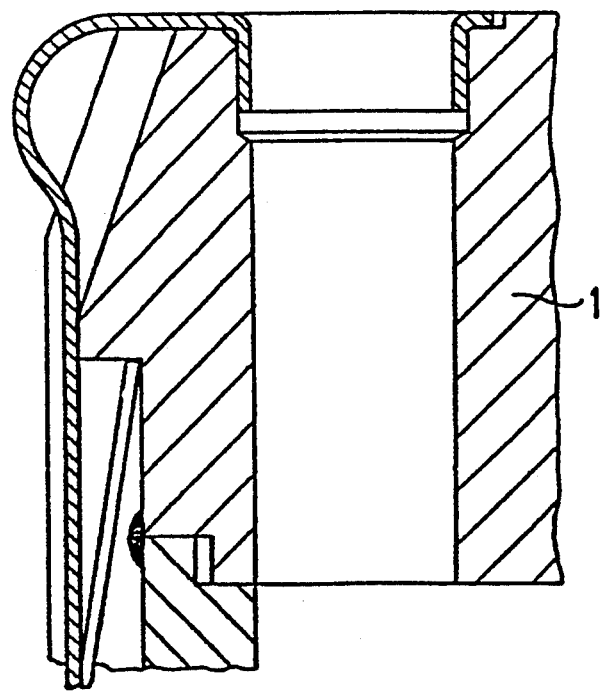

In FIGS. 15 and 16, this sleeve is likewise cylindrically constructed and it runs around the entire coolant inlet. However, it may similarly also open conically upward and be inserted into a correspondingly widened conical part of the coolant inlet.

Figure 17:
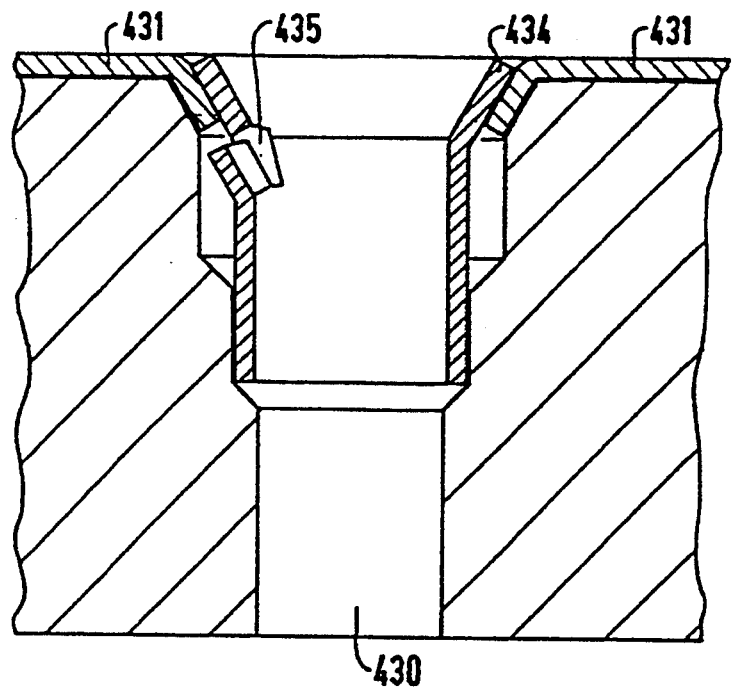
FIGS. 17 and 18 are cross-sectional views of spring sleeves for clamping on sealing springs.

The embodiment according to FIG. 17 shows a clamping connection similar to FIGS. 12 to 16, in which a first side strip 431 likewise partially or fully embraces a corresponding coolant inlet 430. The clamping connection is provided alternatively or additionally to a construction of the spring which permits a securement of the sealing spring by clipping onto the foot part.

A sleeve 434, which may be flexibly constructed, for example by means of a U-shaped slit 435, serves, for example, as a clamping connection. However, in this case this sleeve is configured as an independent component, in order to clamp the spring firmly on the foot part, namely at the coolant passage 430.

Figure 18:
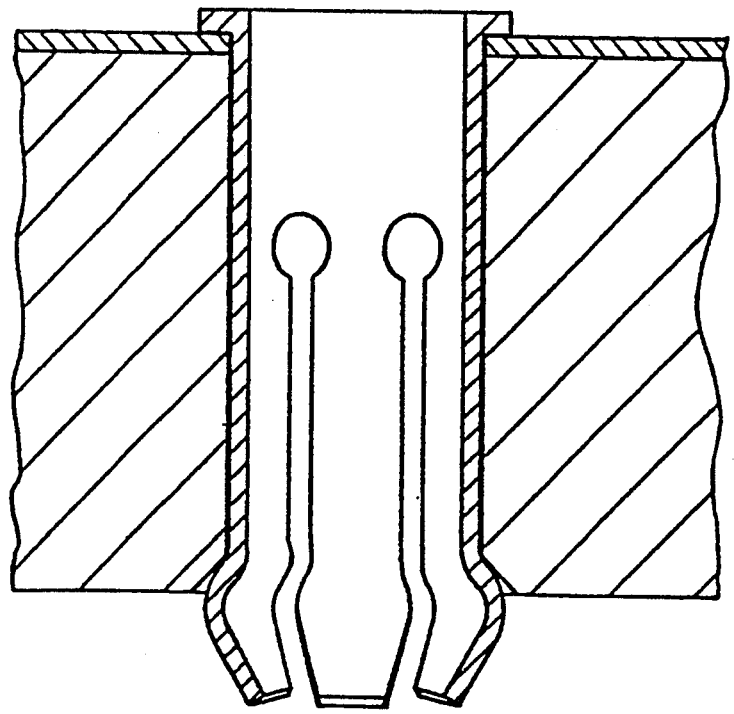
Figure 19:
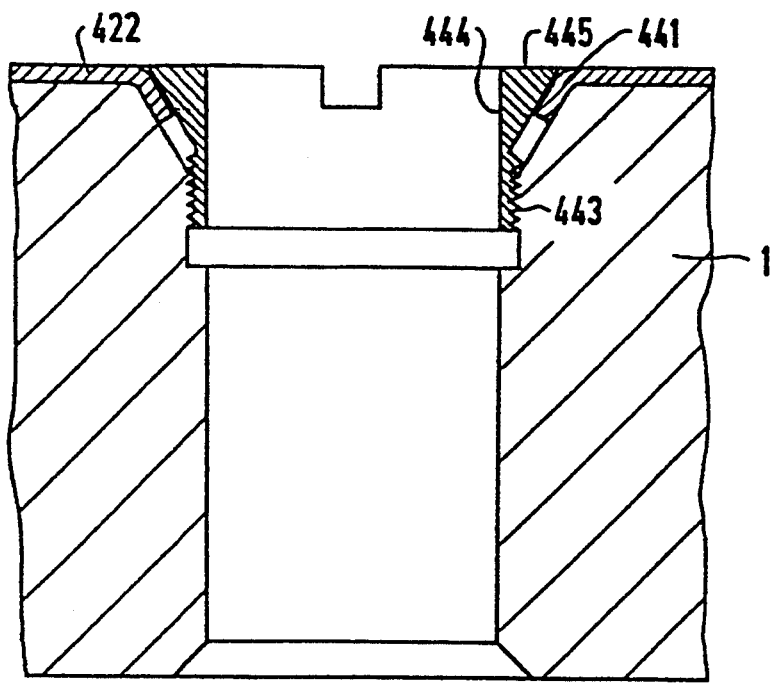
FIG. 19 is a sectional view showing the fastening of a sealing spring with threaded sleeves.

FIG. 18 shows another construction of this clamping device formed by means of a sleeve inserted into the coolant inlet. In particular, use may also be made of a sleeve 444 shown in FIG. 19, which has an external thread 443, that is screwed into the coolant inlet 3, and an end 445, which protrudes on the outer surface of the base plate 1 facing the fuel rod bundle or cluster and extends over a side strip 441 embracing the coolant passage 3.

Figure 20:
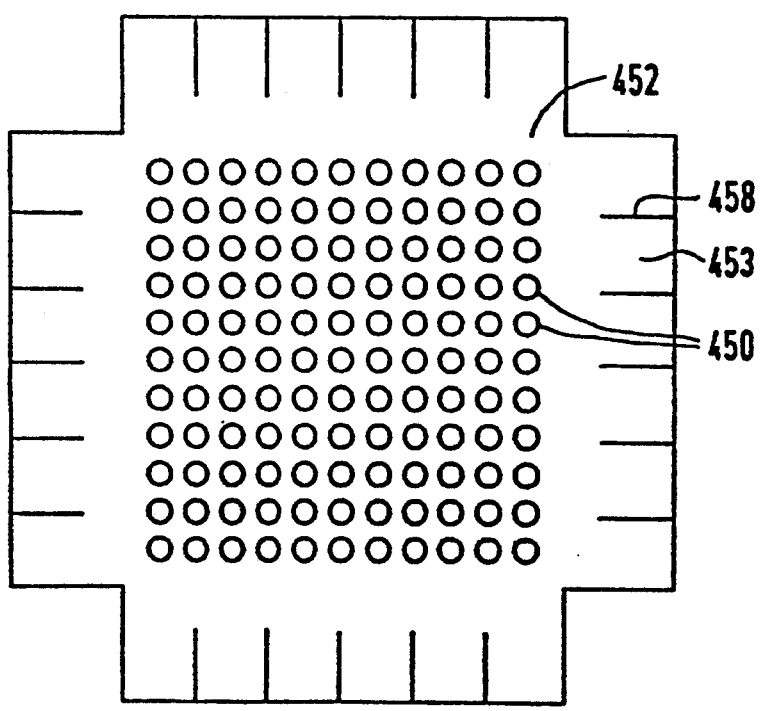
FIGS. 20, 21 and 22 are plan, fragmentary, sectional and plan views of sealing springs including part-springs with plate-shaped connecting parts.

In the case of these configurations of the sealing spring including part-springs, the second side strips of the part-springs, which are assigned to opposite lateral surfaces, may advantageously be connected together. This is shown by FIG. 20, where the connected-together side strips form a plate 452. In this configuration, the connected-together side strips have reliefs or recesses 450, which clear the coolant passages as completely as possible. In this case too, central parts 453 and corresponding first side parts have slits 458, which run transversely to the central part, that is approximately parallel to the fuel rods.

As is shown in FIGS. 13 to 19, in this configuration the second side parts may likewise be firmly clamped on the base plate and/or be able to be clipped on the foot part. In the left-hand part of FIG. 21, the first side strip is has an S-shaped construction for clipping-on. It engages in a profiled groove 459 on the lateral surface of the foot part, on which it is advantageously also supported. In the right-hand part of FIG. 21, the first side strip is formed by catches 457, which engage in a corresponding side profile 456 of the foot part.

Figure 21:
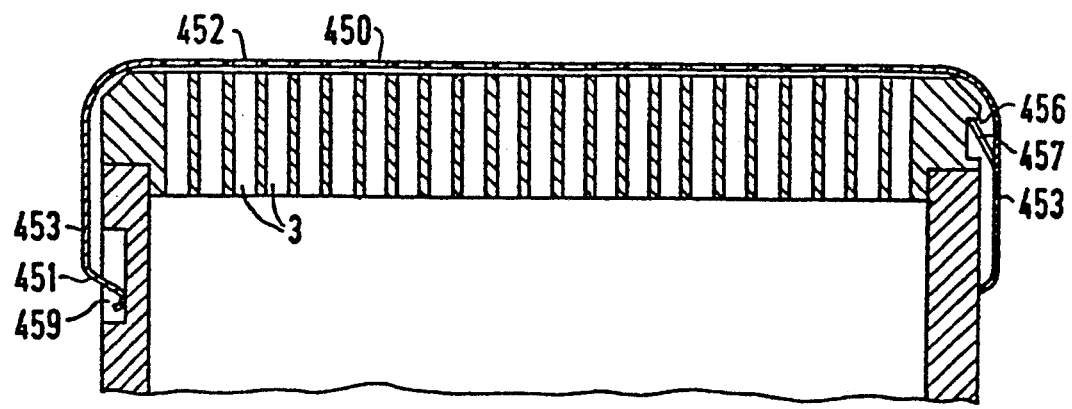
Figure 22:
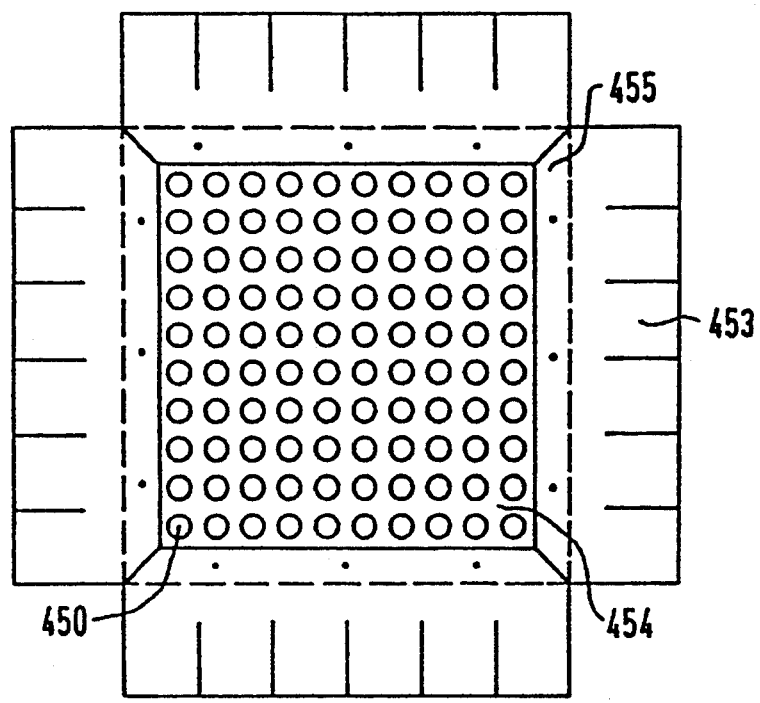

While in FIG. 21 the plate 452 is formed by the second side parts, that is the entire sealing spring is produced as one part, FIG. 22 shows a configuration in which second side strips 455 are connected together by means of a riveted-on or otherwise fastened plate 454.

Figure 23:
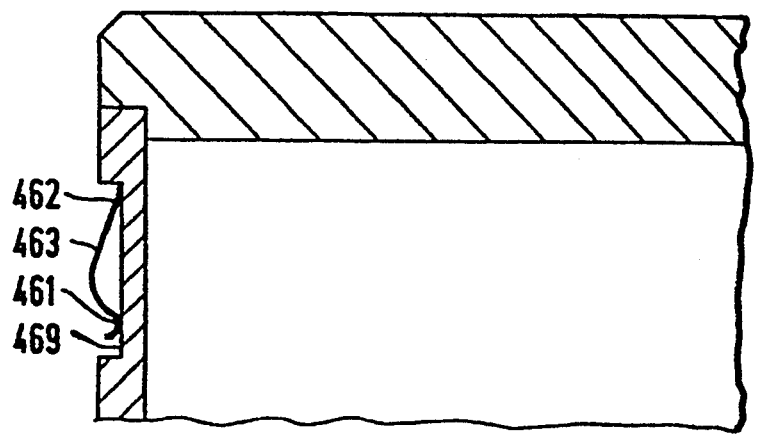
FIGS. 23 and 24 are fragmentary, sectional and perspective views of a sealing spring fitted in the form of band.
Figure 24:
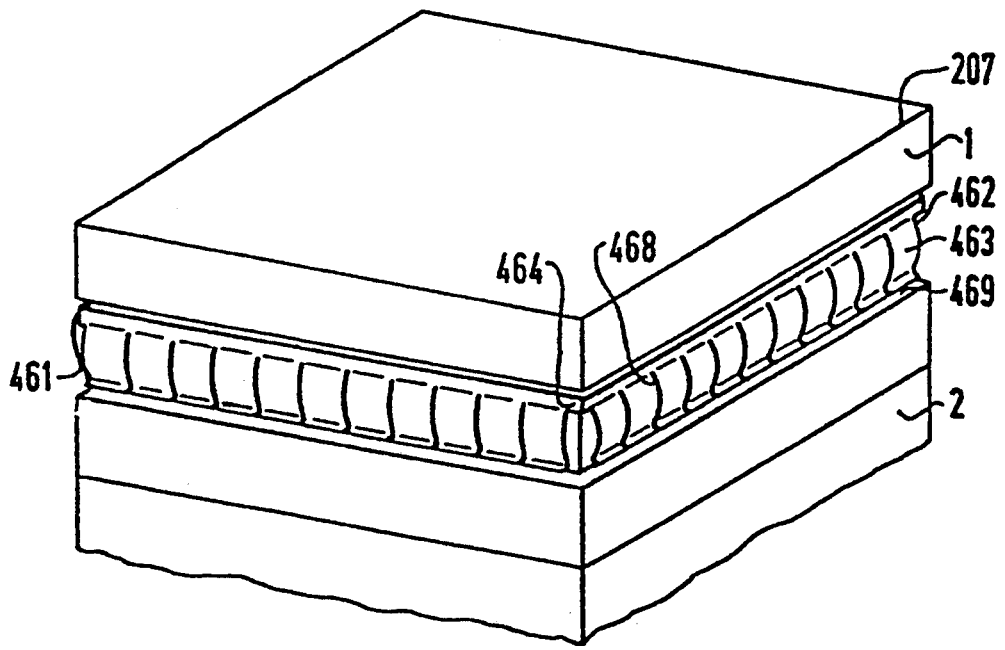

FIG. 23 and FIG. 24 show another configuration of a sealing spring, in which the base plate 1 and/or the transitional piece 2 (that is the foot part) has a profiled groove 469 running around externally underneath the edge 207. The sealing spring has first and second respective side strips 461 and 462 being supported on the foot part underneath and above an arched central part 463, which is supported on the fuel assembly channel and is constructed in the form of a band. This spring band is fitted into the profiled groove 469, with ends 464 of the spring band overlapping or virtually abutting each other. In this configuration, the profiled groove 469 is advantageously closed upon itself, i.e. it runs around the entire foot part. The ends 464 of the band may, in particular, be fastened to each other, so that a spring band which is closed upon itself and is seated captively in the profiled groove is produced. In this case as well it is advantageous if the central part and the first side strip have corresponding slits 468, with which adjoining spring fingers are formed on the second side strip 462. The first side strip itself is advantageously of an S-shaped construction, as FIG. 23 reveals. If the fuel assembly channel has an angular inner cross section at its lower open end and if the foot part has planar lateral surfaces adapted thereto, as FIG. 24 shows, the central part 463 and the first side strip 461 advantageously extend in each case only over these lateral surfaces of the foot part, without running around the corners, which are formed by lateral surfaces abutting one another.

It goes without saying that these forms of springs can be used not only in the case of two-part foot parts but also in the case of foot parts that are produced in one part.

As was already mentioned at the beginning, a fuel assembly for a boiling water reactor often has a coolant pipe which is disposed between the fuel rods of the rod bundle or cluster, parallel to these fuel rods, with a lower end piece having an opening for the coolant. This coolant pipe may be used as a major supporting element of the fuel assembly skeleton, with there being provided on one hand a force-locking, releasable connection between the top plate and an upper end piece of the coolant pipe and a secure, force-locking connection of the lower end piece to the base plate. A force-locking connection is one which connects two elements together by force external to the elements, as opposed to a form-locking connection which is provided by the shapes of the elements themselves.

Figure 25:
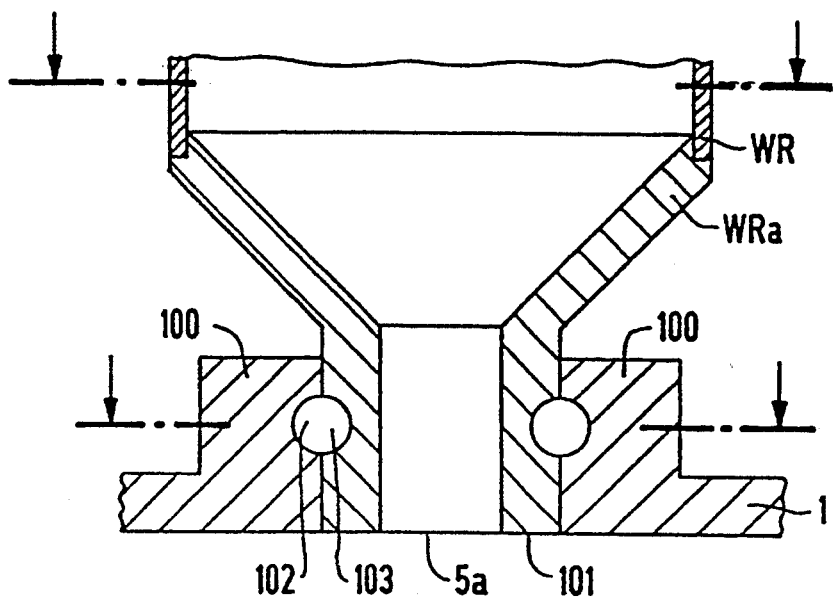
FIGS. 25 and 26 are fragmentary, longitudinal-sectional and cross-sectional views of a secured plug connection between the end piece of a coolant pipe and the base plate ("rod holder")
Figure 26:
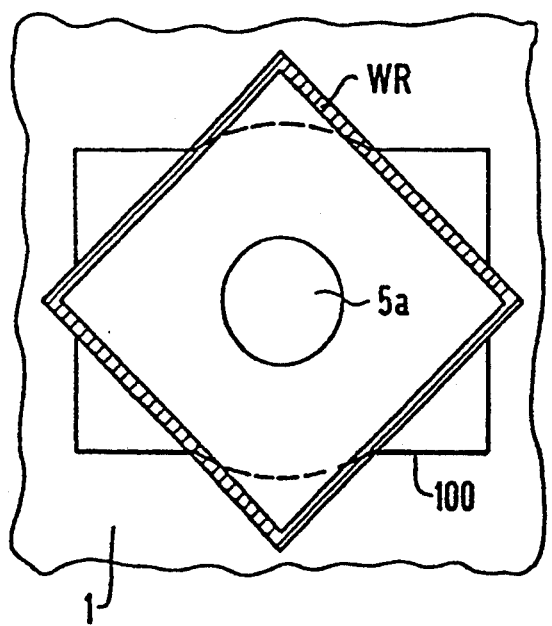
Figure 27:
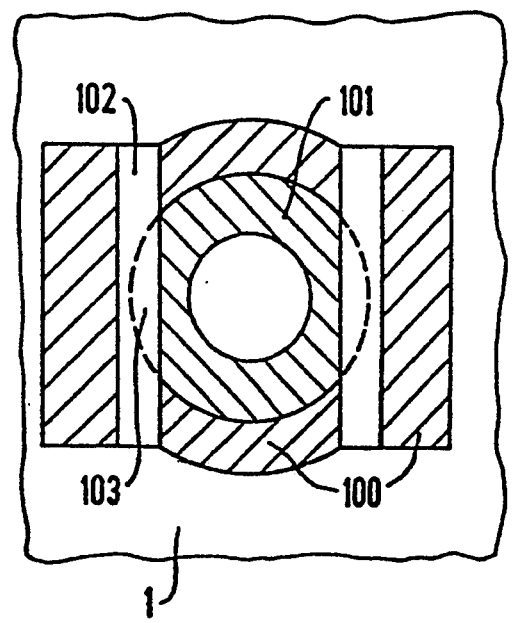
FIG. 27 is a fragmentary, cross-sectional view of another plug connection.
Figure 28:
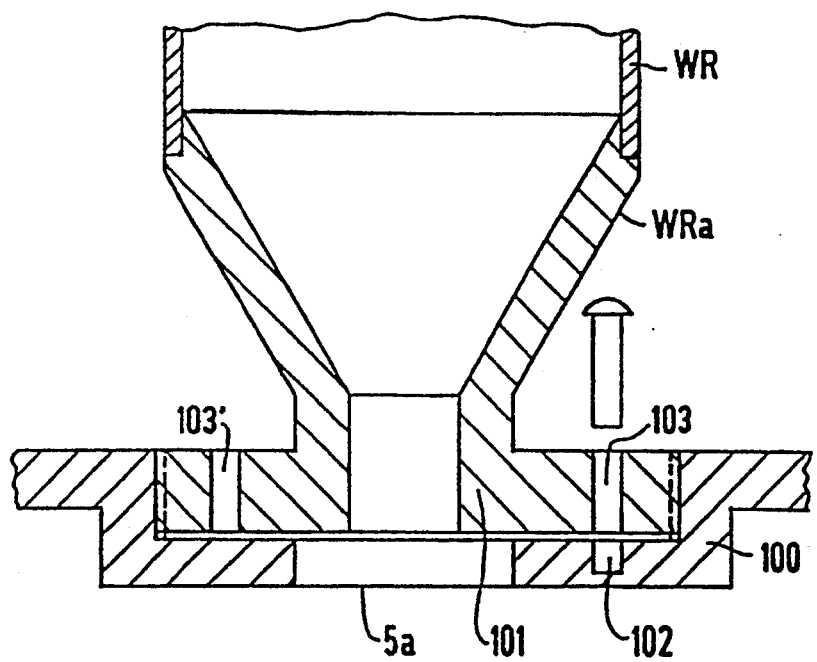

FIGS. 25, 26 and 27 show such a connection between corresponding parts of the base plate 1 and of the lower end piece WRa of the coolant pipe WR, wherein the end piece and the base plate in each case have at least one connecting part 101, 100 with profiles which are adapted to one another and form a releasable connection of the end piece and the base plate. This releasable connection is locked by a securing bolt, engaging in both connecting parts. For this purpose, corresponding reliefs or recesses 102 and 103 are provided in the two connecting parts, into which reliefs the securing bolt can be inserted. In this configuration, the two connecting parts may be plugged one into the other as in FIG. 25 and/or screwed to each other as in FIG. 28.

In this configuration, the connecting part is advantageously inserted and/or screwed into a bore of the base plate and the opening of the coolant pipe leads through the end piece and the bore to the lower surface of the base plate, facing away from the fuel rod bundle or cluster, in order to permit a large opening 5a for the unhindered entry of the coolant into the coolant pipe WR.

Figure 29:
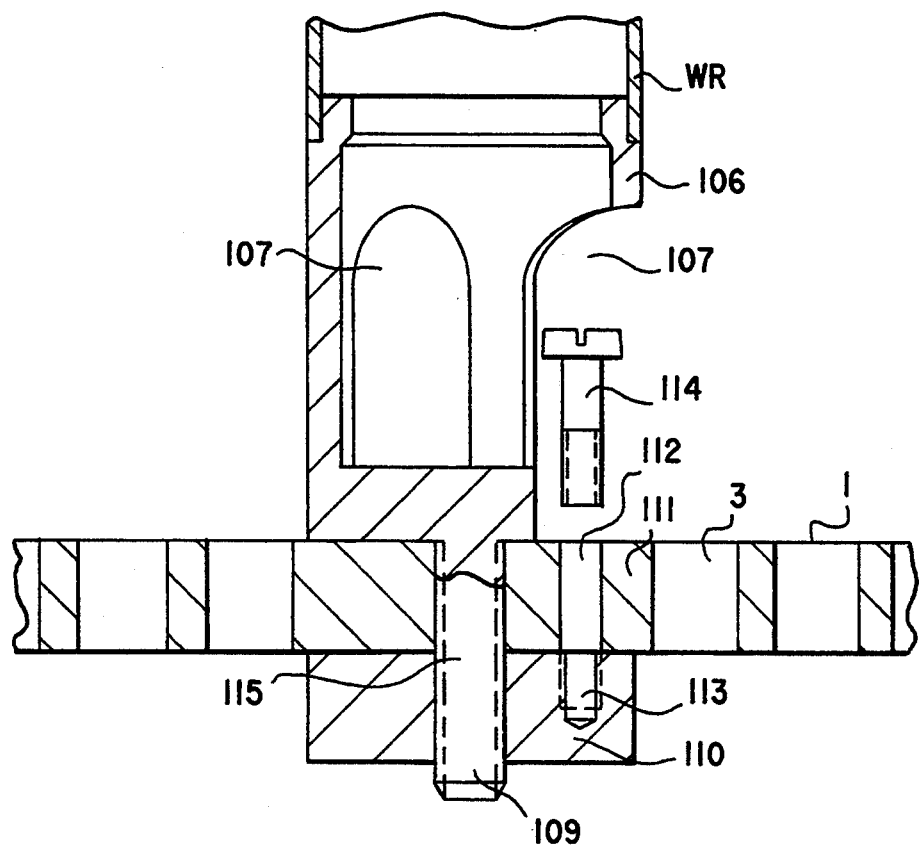
FIGS. 28 and 29 are fragmentary, longitudinal-sectional views of secured screw connections between the end piece and the base plate.

In principle it is not necessary to construct the end piece in one piece with its connecting part. For example, according to FIG. 29, the end piece 106 may be provided with lateral openings 107 and have a downwardly projecting journal 109, which is guided in a bore 115 in a part-piece 111 of the base plate 1 and which has a thread for a nut 110 on its lower end, whereby a force-locking connection between the coolant pipe WR and its end piece on one hand and the base plate 1 on the other hand is likewise achieved. The nut 110 and the part-piece 111 have reliefs or recesses 112 and 113, which form a receiving channel in the ready-assembled state in which a bolt 114 can be inserted. In this case, the bolt 114 is held by means of a thread at its lower end in the relief or recess 113 of the nut 110.

In the relatively rare cases in which the base plate has to be taken off the coolant pipe, even a seizing of the screw connections does not present great problems, since the force-locking connection can be released by drilling out the nut. In order to provide renewed use of the coolant pipe, all that is necessary is to replace the nut 110 and the bolt 114.

However, the connecting parts that are required are advantageously formed onto the base plate 1 and the end piece 106, respectively.

Figure 30:
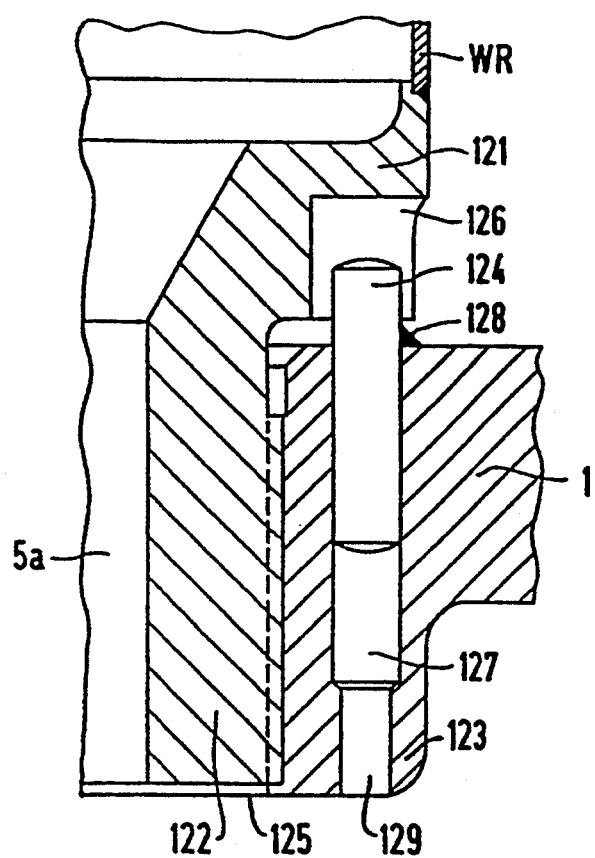
FIGS. 30 and 31 are fragmentary, longitudinal-sectional and cross-sectional views of parts bearing a securing bolt, showing a particularly advantageous secured screw connection between the coolant pipe and the foot part.
Figure 31:
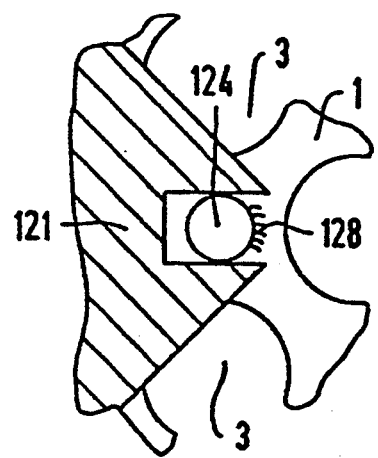

In FIG. 30, the coolant pipe WR, which is disposed between the fuel rods of the rod bundle or cluster and is approximately parallel to the rods, is welded to a lower end piece 121, which has a connecting part in the form of a formed-on pipe piece 122, extending the coolant pipe through a bore in the base plate. The base plate is also assigned a connecting piece, namely a formed-on part-piece 123, which has a bore 125. The two connecting parts 122 and 123 have a profile which forms a releasable connection of the end piece and the base plate and in this case is configured as a thread. This releasable connection is locked by a securing bolt 124.

This securing bolt 124 is initially releasably inserted in corresponding reliefs or recesses 126, 127 of the two locking pieces 122 and 123. After insertion, the bolt is fixed on at least one of the connecting parts, as a welding point 128 indicates.

This achieves a particularly advantageous, torsionally secure fastening which is easily assembled and disassembled. For instance, for assembly, the base plate 1 may be screwed onto the lower end piece 121 until a predetermined distance from an upper end piece of the coolant pipe is approximately reached. Subsequently, these two parts are turned further until the reliefs 126 and 127 (or the relief or recess 102 and one of the reliefs or recesses 103 and 103′ of FIG. 28) form a receiving channel for the securing bolt, in which the latter can be inserted. In this configuration, it may be advantageous for the bolt to be held in only one of the two reliefs, that is, for example, seated entirely in the relief 127, even before locking of the releasable connection. For locking, it is then pushed partially into the other relief, for which purpose there is provided a spur channel 129 in FIG. 30, which is approximately parallel to the coolant pipe, opens out into the relief 127 and through which a tool for lifting the securing bolt can be introduced.

For disassembling, all that is necessary then is for the part of the securing bolt protruding from the relief 127 with the welding point 128 to be cut off.

The end pieces of other rods of the rod bundle or cluster of a fuel assembly, that is, for example, the lower closure caps of the fuel rods, can also be fastened on the base plate according to the same principle. Pressurized water reactors too, having rod bundles or clusters which contain not only mutually parallel fuel rods but also guide tubes with lower end pieces, have a top plate with coolant outlets, which covers the bundle or cluster at the top, and a base plate with coolant inlets, which covers the bundle or cluster at the bottom. In this case too, the end pieces of such a rod, that is the ends of a guide tube and/or the lower closure caps of fuel rods, can be fastened on the base plate in a similar way.

Thus, for such a fastening, the base plate and at least the end piece of one rod in each case have a connecting part, and such connecting parts having profiles which are adapted to one another and form a releasable connection. The end piece is inserted and/or screwed from above into the connection and a bolt prevents the rod from being able to lift off the base plate with its end piece. In such a configuration, it is advantageous for the bolt to be formed onto one of the connecting parts in such a way that the connecting parts form a bayonet closure.

Figure 32:
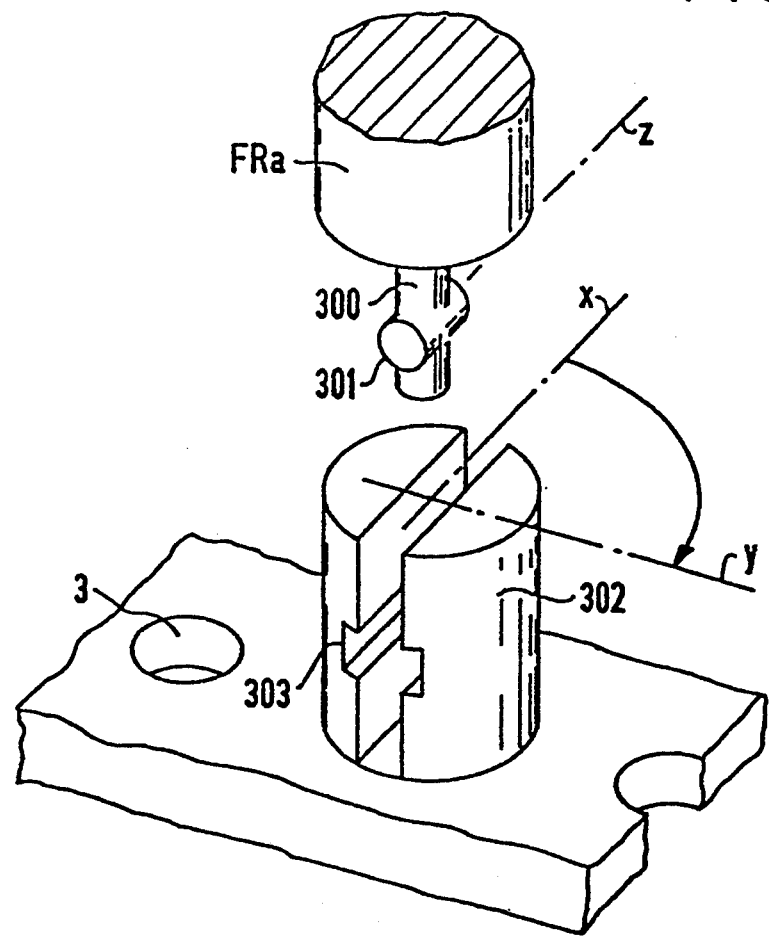
FIG. 32 is a fragmentary, perspective view showing the principle of a bayonet closure between the end cap of a fuel rod and the base plate.

FIG. 32 is a diagrammatic view of such a bayonet closure, having an end piece, that is, for example, the lower end cap FRa of a fuel rod, with a downwardly projecting, cross-shaped connecting part 300 with a lateral attachment 301 which is aligned in the direction of the z axis. In this position, this connecting part can be inserted into a corresponding connecting part in the form of a jaw 302 which is formed on the base plate and has an axial slit in the x direction and a transverse groove 303 running on the inner surfaces of the slit. If the z axis is then turned from the x direction into the y direction, the fuel rod in this position can no longer be lifted off the base plate.

Figure 33:
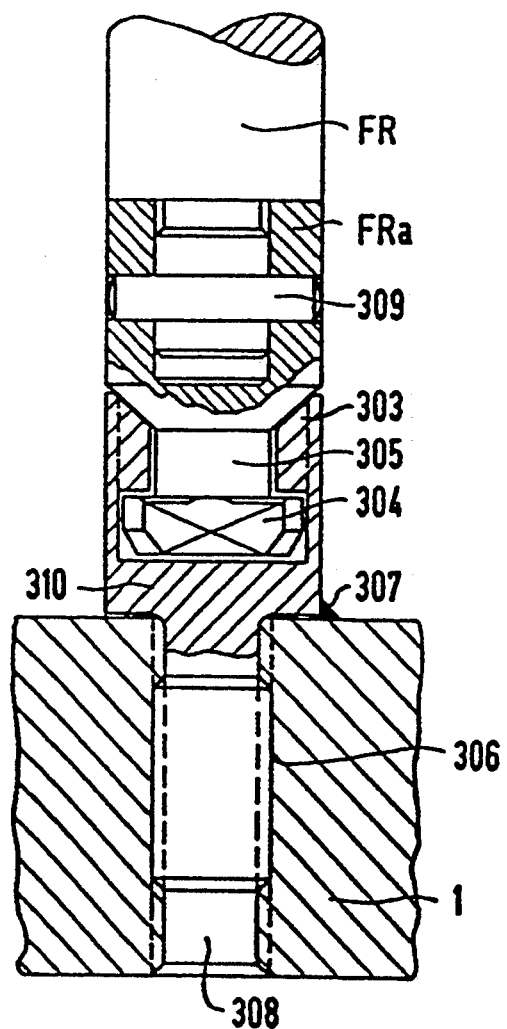
FIG. 33 is a fragmentary, longitudinal-sectional view of a particularly advantageous bayonet closure.

FIG. 33 shows an advantageous construction of such a bayonet closure with a socket which is inserted, for example, by means of a pin 306 into a corresponding bore 308 and, for example, screwed-in there. A socket 310 may be fastened on the base plate, in particular irreleasably, as is represented by a welding point 307. The socket 310 forms one of the two connecting parts.

As opposed to a connecting part which is formed onto the base plate, this provides the possibility of producing the base plate from a special steel, in particular austenitic steel, the end piece FRa of the fuel rod FR from zirconium or a zirconium alloy and the socket from a third material which, in comparison with the end piece, has less of a tendency for the bayonet closure to seize or bake fast than a connecting part formed from the material of the base plate, even after prolonged residence time in the reactor.

In the case of the illustrative embodiment of FIG. 33, one of the two connecting parts is a spike 305, which projects downward from the end cap and on which the bolt is formed as a lateral attachment 304. The other connecting piece, namely the socket 310, has the at least one jaw 302, which is engaged underneath by the bolt as soon as the end piece with its connecting part 305 is inserted into a corresponding opening of the other connecting part (socket 310) and is turned about the longitudinal axis of the rod.

A transverse pin 309, which serves as a marking that indicates the position of the end piece, is advantageously inserted into the end piece FRa.

In the case of the fuel assembly of a boiling water reactor described herein, the base plate and the top plate are held on the central coolant pipe, so that is the distance between them is fixed. At predetermined axial positions on the coolant pipe there are fastened spacers with webs, which are disposed transversely to the rods and form grid meshes or openings through which the fuel rods are led. The fuel rods are supported laterally against the grid meshes, and in the axial direction they can only be moved until they strike against the top plate or base plate. In the case of pressurized water reactors, the base plate, the top plate and the spacers are fastened on guide tubes and instrumentation thimbles or tubes. The fuel rods include cladding tubes containing fuel and in both cases it may be desired to position the lower ends of the fuel rods with the closure caps exactly on the base plate, in order to ensure that the fuel filling of the fuel rods begins in a common plane.

This positioning can be achieved by means of the bayonet connections described above, with it being possible, of course, for the spike bearing the lateral bolt to also be formed by the connecting part assigned to the base plate and for the corresponding jaws or the corresponding sleeve-shaped counterpiece to be formed by the lower closure cap of the respective fuel rod. In that case, the bolt may also be formed laterally on the inner surface of the sleeve-like counterpiece instead of on the spike.

FIG. 34 shows the upper end of the fuel assembly with a group of fuel rods FR, which are also closed off at their upper end by closure caps FRb that are all of a threadless configuration and are therefore only loosely guided in cuffs 61 on the top plate 6. Formed onto or plugged on the top plate 6 is the grip 9, a central part which is provided, for example, in the form of a formed-on collar 67, into which an external thread 93 of a central nut 94 is screwed and held captively at the upper end of the coolant pipe WR, and a lower part 600. Thus, by means of this central nut 94, which consequently represents the connecting part 8 shown in FIG. 1, the fuel assembly skeleton (in particular the top plate, the coolant pipe, the spacers and the base plate) can be held on the grip and raised, for example in order to push the fuel assembly into the fuel assembly channel and insert it into the reactor core. For this purpose, the upper end piece of the coolant pipe WR is constructed as a stud 92, which has a compressively stressed spring 95, in order to permit adequate clearance for an operationally induced change in length of the coolant pipe.

Figure 35:
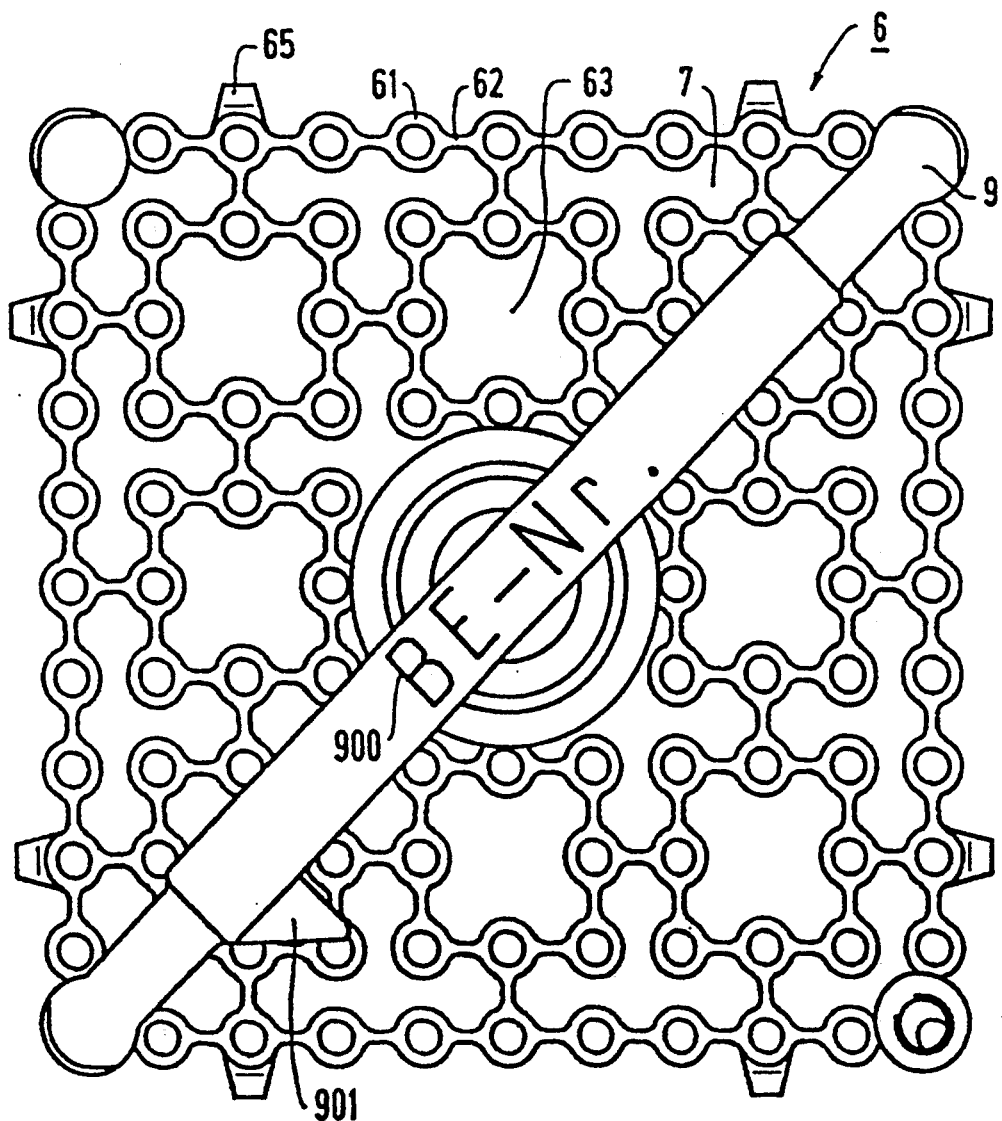

FIG. 35 is a plan view of the fuel assembly head showing that the cuffs 61 are connected together through connecting webs 62 and form the top plate, which bears against the inner surface of the fuel assembly channel WC by means of lateral bearing bosses 65. The grip 9 has a marking 900 for identification of the respective fuel assembly, whereas in the case of fuel assemblies which are constructed unsymmetrically due to different fillings of their fuel rods, a second marking 901 identifies the orientation of the inserted fuel rods.

Intermediate spaces between the rods and cuffs of this top plate serve as outlet openings for the coolant, although at some fuel rod positions the corresponding cuffs are missing and consequently enlarged outlet openings 63 are produced.

Due to these enlarged outlet openings for the fuel rods in these fuel rod positions, there is thus no stop for the axial movement of the fuel rods. The group of fuel rods in these positions is fastened releasably on the base plate in the manner shown in FIGS. 32 to 34. They are shorter than the other fuel rods and already end underneath the uppermost spacer, for example as is shown in FIG. 36.

Figure 36:
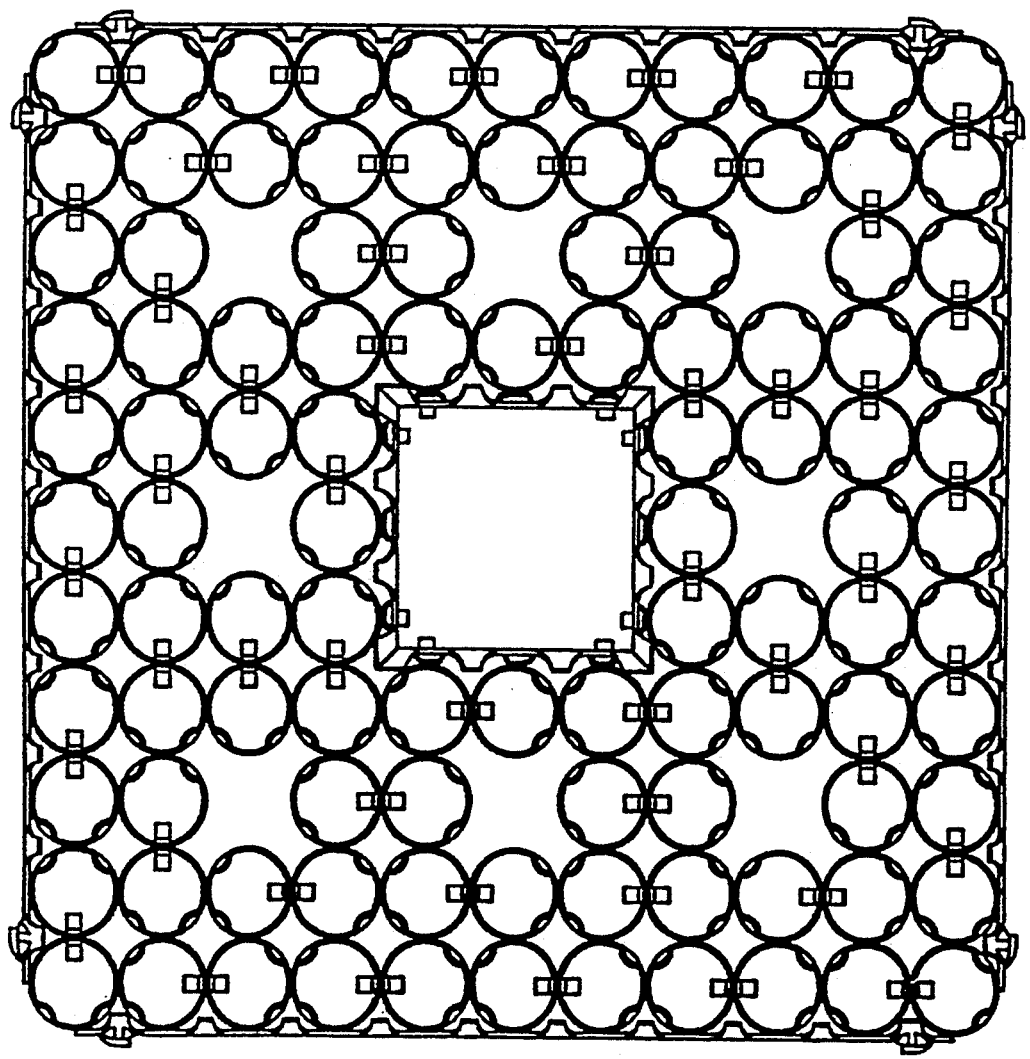
FIGS. 36 and 37 are cross-sectional views of an upper and a lower spacer.
Figure 37:
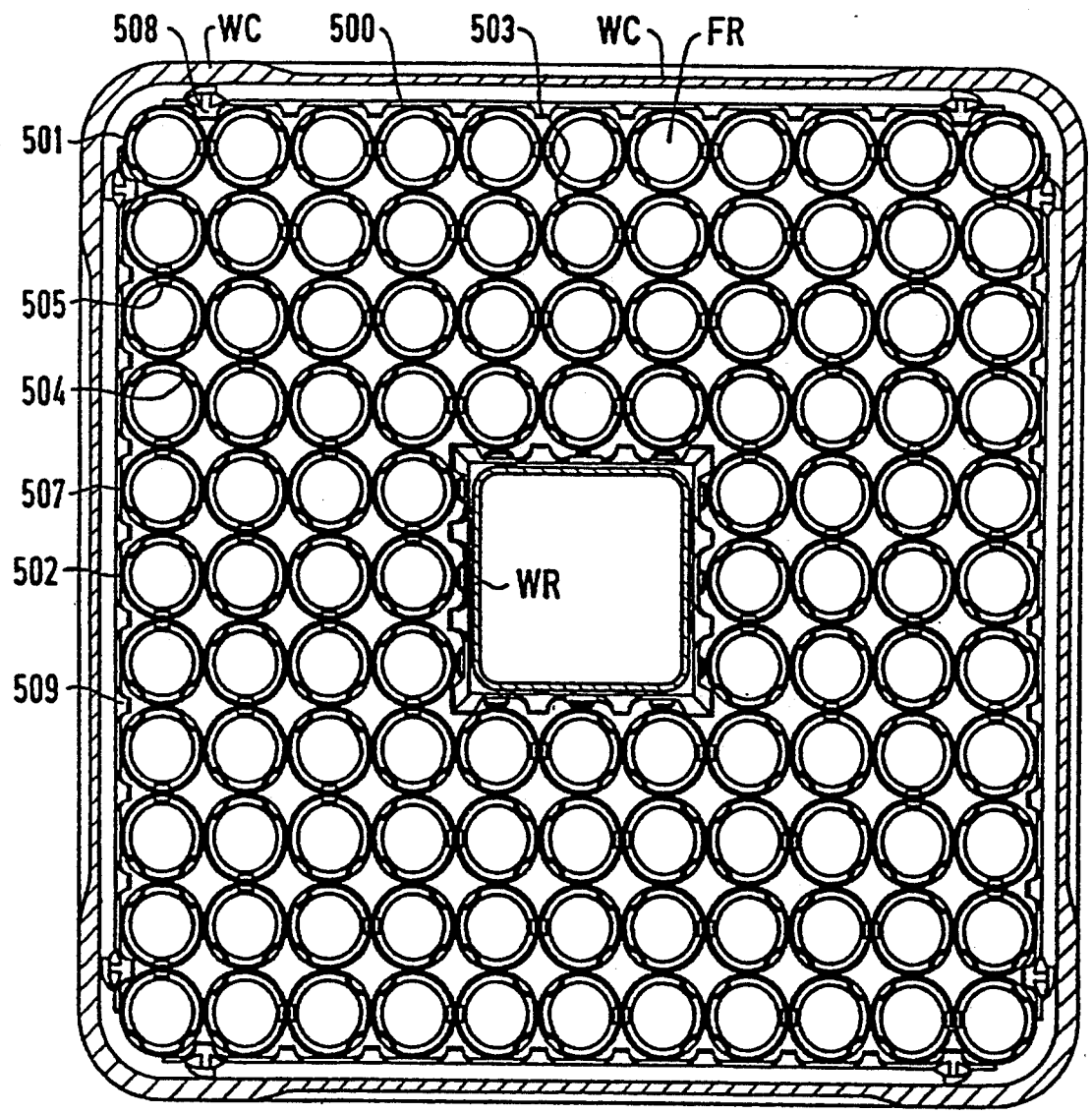

A comparison of FIG. 36 with a corresponding spacer lying underneath according to FIG. 37, shows that the positions of the shorter fuel rods in the case of square fuel assemblies preferably lie at least in the diagonals and/or in such rows and columns of the grid meshes that in each case they are separated from the edge of the fuel assembly by a long fuel rod.

Correspondingly, spacers having webs which surround the fuel rods in the form of sleeves that are welded to one another have a row of edge sleeves 502 and corner sleeves 501 on the edge of the fuel assembly channel WC as well as further rows of inner sleeves 503, wherein the fuel rods are supported in these sleeves by supporting protuberances 504 and supporting springs 505. These web sleeves or inner webs are surrounded by outer webs 507, wherein it is advantageously envisaged to reduce the flow resistance between the spacer and the fuel assembly channel WC, so that these outer webs 507 at the corners of the spacer are connected together only through inner webs, that is, for example, the edge sleeves 501, and spacers with "open corners" are produced. Further measures for reducing the flow resistance at the spacers are described in a simultaneously filed patent application of the same applicant entitled "Fuel assembly for a boiling water reactor with streamlined spacers".

Figure 38:
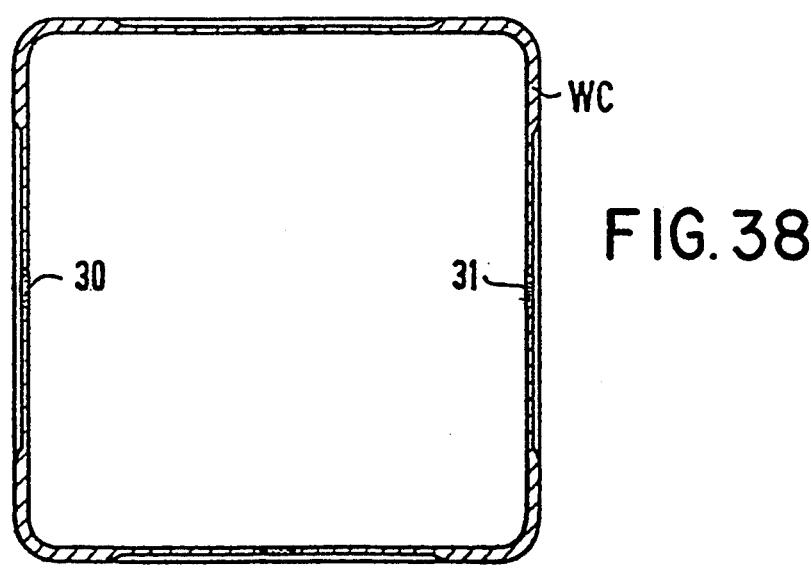
FIG. 38 is a cross-sectional view of a fuel assembly channel.

The spacer is supported by means of narrow bearing protuberances 508 on the inner surfaces of the fuel assembly channel WC shown in cross section in FIG. 38.

This fuel assembly channel has the usual thickness only at the corners and its lower edge, so that it is possible to reduce the central parts of the side walls (and often also the entire upper part of the fuel assembly channel) in order to reduce expenditure on material and to improve the cross-sectional relationships between the fuel, the structural material and the moderator. For this purpose, a correspondingly rolled metal sheet may be connected at its ends by means of a weld 30, to which further welds 31 on the other sides of the channel may correspond in order to maintain symmetry.

Figure 39:
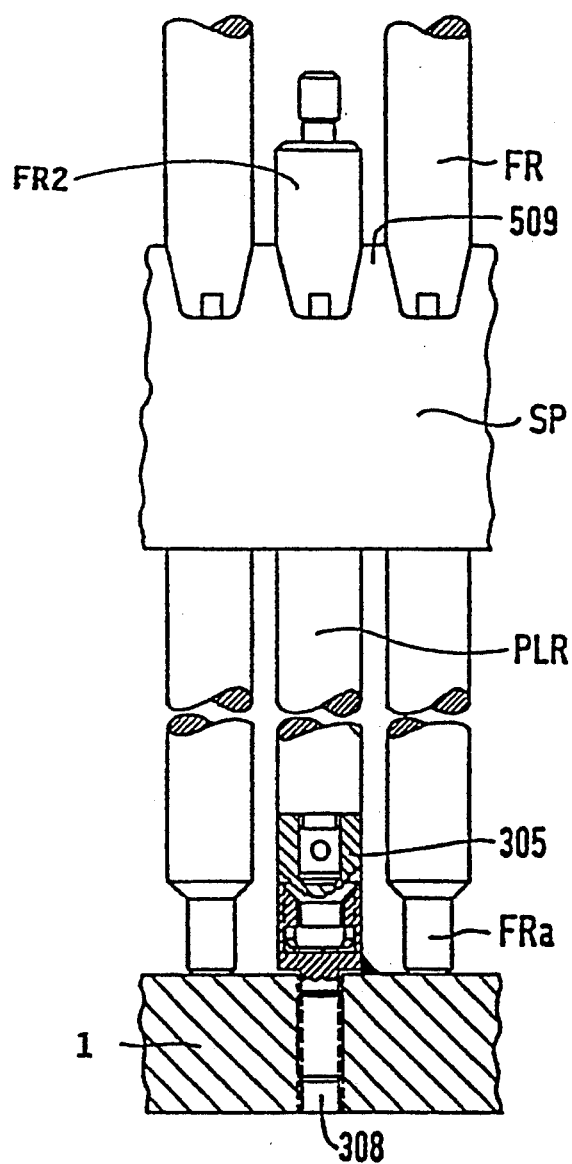
FIG. 39 is a partly sectional, side-elevational view of a shorter fuel rod and its securement in the fuel assembly.

FIG. 39 shows a plan view of the spacer SP described above, which may include flow deflecting surfaces on its upper edge, for example inwardly directed fins 509 on the outer webs. In this case, reference symbol FR2 represents one of the fuel rods from the group of shorter fuel rods, which have profiled extensions 305 that engage in corresponding sockets or adapters, which are inserted in bores 308 of the base plate 1. In contrast, the long fuel rods FR1 advantageously stand with their lower end caps FRa flush on the base plate 1.

The shortening of the fuel rods of the second group provides the possibility of achieving an optimum fuel distribution in the fuel assembly in the axial direction and at the same time of adapting the ratio of fuel to moderator (coolant) particularly to the requirements of neutron economy.

Another possibility of this adaptation is provided if, in addition to a group of normal fuel rods that are filled with fuel virtually over the entire length of the fuel assembly, a second group of fuel rods is used, which in each case have a closed-off lower part filled with fuel and with corresponding lower end caps held on the base plate, but with this lower part being adjoined by a tubular upper part with coolant openings at both ends. These upper parts therefore represent additional coolant pipes and increase the volume available for liquid moderator, but on the other hand can likewise be held in spacer meshes and be adapted to a desired form of flow distribution. As a result, the conditions in the fuel assembly can be stabilized.

The invention thus provides a fuel assembly which can be produced at reasonable cost, is easy to assemble or disassemble for repairs and inspections and is adapted to desired conditions in terms of flow and neutron economy.

We claim:

1. A fuel assembly for a boiling water reactor, comprising:
   a) a cluster of mutually parallel fuel rods;
   b) a fuel assembly channel laterally surrounding said cluster of fuel rods and having open upper and lower ends;
   c) a top plate covering said upper open end of said fuel assembly channel and having coolant outlets formed therein; and
   d) a foot part being assembled from a plurality of individual parts and including:
      i) a cast transitional piece having a lower end with an inlet opening formed therein and an upper edge inserted into said open lower end of said fuel assembly channel, said transitional piece defining and surrounding a flow channel widening upward in funnel-like fashion from said inlet opening; and
      ii) a base plate being disposed at and welded to said upper edge of said transitional piece, said base plate covering said open lower end of said fuel assembly channel and having coolant inlets formed therein.

2. The fuel assembly according to claim 1, wherein said base plate is mounted on said upper edge.

3. The fuel assembly according to claim 1, wherein said base plate has a lower surface with an encompassing groove formed therein facing toward said flow channel, said upper edge of said transitional piece being engaged in said groove.

4. The fuel assembly according to claim 3, wherein said groove forms a gap being open toward said flow channel.

5. The fuel assembly according to claim 4, wherein said upper edge of said transitional piece has lugs protruding into said gap with fitting surfaces resting on said base plate.

6. The fuel assembly according to claim 1, wherein said fuel assembly channel has a square inside cross section, said transitional piece and said base plate each have a square outside cross section with four lateral surfaces oriented toward said fuel assembly channel, and each of said lateral surfaces has a middle part with a weld applied from the side toward said fuel assembly channel.

7. The fuel assembly according to claim 1, wherein said base plate is penetrated in sieve-like fashion by said coolant inlets, and said coolant inlets have a shape trapping foreign bodies exceeding predetermined dimensions being entrained in the coolant.

8. The fuel assembly according to claim 1, wherein said transitional piece has at least two openings formed therein extending laterally out of said flow channel.

9. The fuel assembly according to claim 1, including a water pipe being parallel to said fuel rods, having a lower end piece, having an open bottom and top, and locking said base plate to said top plate, said base plate having a middle with an opening formed therein reaching through said lower end piece of said water pipe.

10. The fuel assembly according to claim 9, wherein said lower end piece of said water pipe is held in a torsion-proof manner in said opening.

11. The fuel assembly according to claim 1, including at least one spring being supported against said fuel assembly channel and resting on said upper edge of said transitional piece.

12. The fuel assembly according to claim 11, wherein said spring has an edge engaging a profile formed on said upper edge of said transitional piece.

13. The fuel assembly according to claim 1, including means for fastening at least some of said fuel rods, said fastening means engaging bores formed in said base plate.

14. The fuel assembly according to claim 13, wherein said fuel rods include one group of fuel rods being relatively shorter and another group of fuel rods being relatively longer, and said fastening means fasten only said shorter fuel rods to said base plate.

15. The fuel assembly according to claim 13, wherein said fastening means are plug-type connections.

16. The fuel assembly according to claim 14, wherein said fastening means are plug-type connections.

17. A foot part for a fuel assembly of a boiling water reactor, comprising a transitional piece defining and surrounding a flow channel widening in funnel-like fashion upward along a center axis, said transitional piece having a lower end with at least one inlet opening formed therein and an upper end with an edge; and a one-piece base plate being welded to said edge, covering said flow channel at the top and having coolant inlets formed therein for a flow of coolant through the fuel assembly.

18. The foot part according to claim 17, wherein at least one of said base plate and said upper edge of said transitional piece have a profile with which said base plate engages said upper edge of said transitional piece.

19. The foot part according to claim 17, wherein said base plate is mounted on said upper edge of said transitional piece with a play at right angles to fuel rods in the fuel assembly, and said base plate is fixed in a dimensionally accurate position by a weld.

20. The foot part according to claim 18, wherein said base plate is mounted on said upper edge of said transitional piece with a play at right angles to fuel rods in the fuel assembly, and said base plate is fixed in a dimensionally accurate position by a weld.

* * * * *